United States Patent
Fong et al.

(10) Patent No.: US 12,200,678 B2
(45) Date of Patent: Jan. 14, 2025

(54) SYSTEM AND METHOD FOR MULTI-CARRIER NETWORK OPERATION

(71) Applicant: BlackBerry Limited, Waterloo (CA)

(72) Inventors: Mo-Han Fong, Sunnyvale, CA (US); Youn Hyoung Heo, Waterloo (CA); Hua Xu, Ottawa (CA); Jun Li, Richardson, TX (US); Sean Michael McBeath, Keller, TX (US)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 18/492,942

(22) Filed: Oct. 24, 2023

(65) Prior Publication Data

US 2024/0057055 A1    Feb. 15, 2024

Related U.S. Application Data

(63) Continuation of application No. 17/083,749, filed on Oct. 29, 2020, now Pat. No. 11,937,221, which is a (Continued)

(51) Int. Cl.
*H04W 72/0453* (2023.01)
*H04L 5/00* (2006.01)
(Continued)

(52) U.S. Cl.
CPC ......... *H04W 72/0453* (2013.01); *H04L 5/001* (2013.01); *H04L 5/0053* (2013.01);
(Continued)

(58) Field of Classification Search
CPC ...... H04W 72/0453; H04W 72/23–232; H04L 5/001; H04L 5/00053; H04L 5/0094
See application file for complete search history.

(56) References Cited

U.S. PATENT DOCUMENTS

| | | |
|---|---|---|
| 6,591,399 B1 | 7/2003 | Wyrzykowska et al. |
| 6,636,721 B2 | 10/2003 | Threadgill et al. |
| | (Continued) | |

FOREIGN PATENT DOCUMENTS

| | | |
|---|---|---|
| CN | 1554204 | 12/2004 |
| CN | 1852530 | 10/2006 |
| | (Continued) | |

OTHER PUBLICATIONS

Amirijoo et al., "On Self-Optimization of the Random Access Procedure in 3G Long Term Evolution," in Integrated Network Management Workshops, 2009. IM'09. IFIP/IEEE International Symposium, Jun. 1-5, 2009, 177-184.

(Continued)

*Primary Examiner* — Kevin C. Harper
(74) *Attorney, Agent, or Firm* — Fish & Richardson P.C.

(57) ABSTRACT

Methods, devices, and systems for multi-carrier network operation are disclosed. In one embodiment, a method of performing channel scrambling in a multi-carrier network, wherein the multi-carrier network includes a first component carrier ("CC") and a second CC between a base station and a user equipment ("UE") comprises receiving a Cell Radio Network Temporary Identifier ("C-RNTI") and a cell identification ("ID") for at least one of the first CC and the second CC; and using the RNTI and the cell ID to perform scrambling of information transmitted on at least one of the first CC and the second CC.

12 Claims, 21 Drawing Sheets

Related U.S. Application Data continuation of application No. 15/452,497, filed on Mar. 7, 2017, now Pat. No. 10,826,658, which is a continuation of application No. 13/498,318, filed as application No. PCT/US2010/050263 on Sep. 24, 2010, now abandoned.

(60) Provisional application No. 61/246,064, filed on Sep. 25, 2009.

(51) Int. Cl.
| | |
|---|---|
| *H04W 72/23* | (2023.01) |
| *H04L 25/03* | (2006.01) |
| *H04W 8/26* | (2009.01) |
| *H04W 12/033* | (2021.01) |
| *H04W 36/06* | (2009.01) |
| *H04W 72/21* | (2023.01) |
| *H04W 76/27* | (2018.01) |

(52) U.S. Cl.
CPC ........... *H04L 5/0094* (2013.01); *H04W 72/23* (2023.01); *H04L 25/03866* (2013.01); *H04W 8/26* (2013.01); *H04W 12/033* (2021.01); *H04W 36/06* (2013.01); *H04W 72/21* (2023.01); *H04W 76/27* (2018.02)

(56) References Cited

U.S. PATENT DOCUMENTS

| | | |
|---|---|---|
| 6,850,497 B1 | 2/2005 | Sigler et al. |
| 7,161,989 B1 | 1/2007 | Isaksen et al. |
| 7,890,114 B2 | 2/2011 | Braun et al. |
| 8,239,721 B2 | 8/2012 | Pelletier |
| 8,379,579 B2 | 2/2013 | Li |
| 8,565,167 B2 | 10/2013 | Chen et al. |
| 8,583,128 B2 | 11/2013 | Choi et al. |
| 8,644,200 B2 | 2/2014 | Willenegger et al. |
| 8,644,245 B2 | 2/2014 | Ahn et al. |
| 8,654,623 B2 | 2/2014 | Luo |
| 8,661,477 B2 | 2/2014 | Nathan et al. |
| 8,681,724 B2 | 3/2014 | Du et al. |
| 8,837,424 B2 | 9/2014 | Chun et al. |
| 8,848,641 B2 | 9/2014 | Fong et al. |
| 8,934,417 B2 | 1/2015 | Nory |
| 8,983,479 B2 | 3/2015 | Ko et al. |
| 9,002,015 B2 | 4/2015 | Fong et al. |
| 9,048,924 B2 | 6/2015 | Chung |
| 10,631,324 B2 | 4/2020 | Fong et al. |
| 10,826,658 B2 | 11/2020 | Fong et al. |
| 2004/0252724 A1 | 12/2004 | Jou |
| 2006/0268919 A1 | 11/2006 | Malladi et al. |
| 2007/0015476 A1 | 1/2007 | Akbar Attar et al. |
| 2008/0062921 A1 | 3/2008 | Lakkis |
| 2008/0132227 A1 | 6/2008 | Pedlar et al. |
| 2008/0267126 A1 | 10/2008 | Vujcic et al. |
| 2009/0034486 A1 | 2/2009 | Takahashi et al. |
| 2009/0122731 A1 | 5/2009 | Montojo et al. |
| 2009/0163211 A1 | 6/2009 | Kitazoe |
| 2009/0170498 A1 | 7/2009 | Venkatasubramanian et al. |
| 2009/0238366 A1 | 9/2009 | Park et al. |
| 2009/0257357 A1 | 10/2009 | Marsh |
| 2009/0257387 A1 | 10/2009 | Gholmieh et al. |
| 2009/0300456 A1 | 12/2009 | Pelletier |
| 2010/0034161 A1 | 2/2010 | Luo |
| 2010/0040037 A1 | 2/2010 | Choi et al. |
| 2010/0062783 A1 | 3/2010 | Luo et al. |
| 2010/0091678 A1 | 4/2010 | Chen et al. |
| 2010/0227569 A1 | 9/2010 | Bala et al. |
| 2010/0232373 A1 | 9/2010 | Nory |
| 2010/0238870 A1 | 9/2010 | Mitra et al. |
| 2010/0273515 A1 | 10/2010 | Fabien |
| 2010/0279695 A1 | 11/2010 | Amirijoo et al. |
| 2010/0285809 A1 | 11/2010 | Lindstrom et al. |
| 2010/0303011 A1 | 12/2010 | Pan et al. |
| 2011/0002281 A1 | 1/2011 | Terry et al. |
| 2011/0034175 A1 | 2/2011 | Fong et al. |
| 2011/0044259 A1 | 2/2011 | Nimbalker et al. |
| 2011/0075629 A1 | 3/2011 | Seo et al. |
| 2011/0111785 A1 | 5/2011 | Lindoff et al. |
| 2011/0134872 A1 | 6/2011 | Nakao et al. |
| 2011/0143796 A1 | 6/2011 | Lee et al. |
| 2011/0176477 A1 | 7/2011 | Lee et al. |
| 2011/0222501 A1 | 9/2011 | Kim et al. |
| 2011/0249657 A1 | 10/2011 | Kishiyama et al. |
| 2011/0255469 A1 | 10/2011 | Kishiyama et al. |
| 2011/0305134 A1 | 12/2011 | Chung et al. |
| 2012/0009963 A1 | 1/2012 | Kim et al. |
| 2012/0078933 A1 | 3/2012 | Kim et al. |
| 2012/0106460 A1* | 5/2012 | Yang ............. H04L 5/001 370/328 |
| 2012/0106569 A1 | 5/2012 | Che et al. |
| 2012/0113941 A1* | 5/2012 | Chung ............. H04L 5/008 370/329 |
| 2012/0188959 A1* | 7/2012 | Kim ............. H04J 11/0069 370/329 |
| 2013/0010619 A1 | 1/2013 | Fong et al. |
| 2013/0010964 A1 | 1/2013 | Fong et al. |
| 2013/0016841 A1 | 1/2013 | Fong et al. |
| 2013/0051214 A1 | 2/2013 | Fong et al. |
| 2014/0254521 A1 | 9/2014 | Fong et al. |
| 2017/0164400 A1 | 6/2017 | Fong et al. |
| 2017/0181145 A1 | 6/2017 | Fong et al. |
| 2021/0044395 A1 | 2/2021 | Fong et al. |

FOREIGN PATENT DOCUMENTS

| | | |
|---|---|---|
| CN | 101238665 | 8/2008 |
| CN | 101272232 | 9/2008 |
| CN | 101389054 | 3/2009 |
| CN | 101529783 | 9/2009 |
| CN | 101540978 | 9/2009 |
| CN | 101541029 | 9/2009 |
| CN | 101651996 | 2/2010 |
| EP | 2244409 | 10/2010 |
| WO | WO 2008023945 | 2/2008 |
| WO | WO 2008097965 | 8/2008 |
| WO | WO 2009038367 | 3/2009 |
| WO | WO 2009088739 | 7/2009 |
| WO | WO 2010048178 | 4/2010 |
| WO | WO 20100048178 | 4/2010 |
| WO | WO 2010105148 | 9/2010 |
| WO | WO 2010123793 | 10/2010 |
| WO | WO 2010129618 | 11/2010 |
| WO | WO 2011019966 | 2/2011 |

OTHER PUBLICATIONS

"3rd Generation Partnership Project; Technical Specification Group Radio Access Network; Radio Resource Control (RRC) Protocol Specification (Release 9)"; 3GPP TS 25.331 V9.0.0; Sep. 2009, 427 pages.

"LTE; Evolved Universal Terrestrial Radio Access (E-UTRA); Radio Resource Control (RRC); Protocol Specification (2GPP TS 36.331 version 8.6.0 Release 8)"; ETSI TS 136 331 V8.6.0; Jul. 2009; 212 pages.

Catt, Ritt, Potevio; "Design of DL Control Channel for LTE-A with Carrier Aggregation"; 3GPP TSG RAN WG1 Meeting #58 (R1-093530); Shenzhen, China; Aug. 24-28, 2009; 4 pages.

Catt; "System Information Acquisition in CA"; 3GPP TSG RAN WG2 Meeting #67 (R2-094321—Update of R2-093720); Shenzhen, China; Aug. 24-28, 2009; 2 pages.

Catt; "Initial Random Access Procedure for LTE-A"; 3GPP TSG RAN WG1 Meeting #56bis (R1-091527); Seoul, South Korea; Mar. 23-27, 2009; 5 pages.

Damnjanovic, A Survey on 3GPP Heterogenous Networks, Jun. 2011, IEEE, vol. 3 pp. 10-21.

Ericsson, ST-Ericsson; "Measurements for Carrier Aggregation"; 3GPP TSG RAN WG2 #68bis (R2-100122); Valencia, Spain; Jan. 18-22, 2010; 8 pages.

(56) References Cited

OTHER PUBLICATIONS

Ericsson; Carrier Aggregation in LTE-Advanced; TSG-RAN WG1 #53bis (R1-082468); Warsaw, Poland, Jun. 30-Jul. 4, 2008.
Huawei; "DL/UL Asymmetric Carrier Aggregation"; 3GPP TSG RAN WG1 Meeting #54bis (R1-083706); Prague, Czech Republic; Sep. 29-Oct. 3, 2008; 4 pages.
Huawei; "CA Cell Operations"; 3GPP TSG RAN WG2 Meeting #67 (R2-094749); Shenzhen, China; Aug. 24-28, 2009; 4 pages.
Huawei; "Discussion on Active Sets and Measurements in DC-HSUPA"; 3GPP TSG RAN WG2 Meeting #66 (R2-093157); San Francisco; May 4-8, 2009; 4 pages.
Huawei; "DL-UL CC Linking in CA"; 3GPP TSG-RAN WG2 #69 (R2-101019); San Francisco; Feb. 22-26, 2010; 6 pages.
Huawei; "Improvements on Control Channel for Carrier Aggregation"; 3GPP TSG RAN WG1 Meeting #58 (R1-093048); Shenzhen, China; Aug. 24-28-2009; 4 pages.
InterDigital Communications, LLC; "Cross Carrier Operation for Bandwidth Extension"; 3GPP TSG-RAN WG1 Meeting #58 (R1-093067); Shenzhen, China; Aug. 24-28, 2009; 8 pages.
InterDigital; "Physical Channel Establishment and Radio Link Failure"; 3GPP TSG-RAN WG2 Meeting #67 (R1-094804); Shenzhen, China; Aug. 24-28, 2009; 4 pages.
InterDigital; "RLF Procedures for Carrier Aggregation"; 3GPP TSG-RAN WG2 Meeting #67 (R2-094218); Shen Zhen, China; Aug. 24-28, 2009, 4 pages.
LG Electronics; "Considerations on DL/UL Transmission in Asymmetric Carrier Aggregation"; 3GPP TSG RAN WG1 Meeting #55 (R1-084197); Prague, Czech Republic; Nov. 10-14, 2009; 5 pages.
LG Electronics; "Cell and Carrier for Ca"; 3GPP TSG-RAN WG2 #67 (R2-094633); Shenzhen, China; Aug. 24-29, 2009; 4 pages.
LG Electronics; "Secondary Carrier Intra-/Inter-Frequency Measurement Procedure"; 3GPP TSG RAN WG2 Meeting #67bis (R2-096024); Miyazaki, Japan; Aug. 12-16, 2009; 2 pages.
Nokia Corporation, Nokia Siemens Networks; "Radio Link Failure Open Issues"; 3GPP TSG-RAN WG2 Meeting #68 (R2-096845); Jeju, South Korea; Nov. 9-13, 2009; 4 pages.
Nokia Siemens Networks; "Considerations on Initialization and Mapping of DM-RS Sequence"; 3GPP TSG RAN WG1 #58 Meeting (R1-093304); Shenzhen, China; Aug. 24-28, 2009; 4 pages.
Nokia Siemens Networks; "Way Forward on Scrambling Sequence Initialisation"; 3GPP TSG-RAN Working Group 1 #52 (Tdoc R1-081128); Sorrento, Italy; Feb. 11-15, 2008; 3 pages.
Panasonic; "System Information Modification Indication in Carrier Aggregation"; 3GPP TSG RAN WG2#67 (R2-094187); Shenzhen, China; Aug. 24-28, 2009; 4 pages.
Panasonic; "LTE-Advanced Discussion for RAN2"; 3GPP TSG RAN WG2 #65bis (R2-092394); Seoul, Korea; Mar. 23-27, 2009; 7 pages.
Qualcomm; "Notion of Ancor Carrier in LTE-A"; 3GPP TSG RAN WG1 Meeting #55bis (R1-080356); Ljubljana, Slovenia; Jan. 12-16, 2009; 5 pages.
Research in Motion UK Limited; "System Information Acquisition for Carrier Aggregation"; 3GPP TSG RAN WG2 Meeting #67bis (R2-095831); Miyazaki, Japan; Oct. 12-16, 2009; 4 pages.
Research in Motion UK Limited; Support of Carrier Aggregation with Heterogeneous Deployment of Component Carriers; 3GPP TSG RAN WG1; Meeting #58 (R1-093289); Shenzhen, China, Aug. 24-28, 2009, 3 pages.
Texas Instruments: "Downlink and Uplink Control to Support Carrier Aggregation"; 3GPP TSG RAN WG1 #57 (R1-092198); San Francisco, California; May 4-8, 2009; 5 pages.
ZTE; Downlink Control Signalling Design for LTE-A; 3GPP TSG-RAN WG1 #56bis (R1-091429); Seoul, Korea; Mar. 2009, 4 pages.
ZTE; "Initial Uplink Access Procedure in LTE-Advanced"; 3GPP TSG RAN WG1 Meeting #56 (R1-090984); Athens, Greece; Feb. 9-13, 2009; 5 pages.
ZTE; "Radio Link Failure Trigger in a Carrier Aggregation"; 3GPP TSG-RAN WG2#67 (R2-094705); Shenzhen, China; Aug. 24-28, 2009; 2 pages.

3GPP Technical Specification Group Radio Access Network; Evolved Universal Terrestrial Radio Access (E-UTRA); Physical Channels and Modulation (Release 8) version 8.6.0 Document No. 36.211, Mar. 2009, 83 pages.
3rd Generation Partnership Project (Technical Specification Group Radio Access Network; Evolved Universal Terrestrial Radio Access (E-UTRA); Physical layer procedures (Release 8) Version 8.6.0 Document No. TS 36.213 published Mar. 2009, 77 pages.
Nanda, "Adpatation techniques in wireless packet data services," Jan. 2000, IEEE, vol. 38, pp. 54-64.
3GPP TS 36.213 V8.4.0 (Sep. 2008) (hereinafter TS 36.213), titled Evolved Universal Terrestrial Radio Access (E-UTRA); Physical layer procedures, Sep. 2008, pp. 1-60.
ZTE, "Considerations on System Information for Carrier Aggregation," 3GPP TSG-RAN WG2 #66bis (R2-093883); Los Angeles, CA; Jun. 29-Jul. 3, 2009; 2 pages.
3GPP TS 36.331 V8.5.0, "3rd Generation Partnership Project; Technical Specification Group Radio Access Network; Evolved Universal Terrestrial Radio Access (E-UTRA) Radio Resource Control (RRC); Protocol specification (Release 8)," Version 8.5.0, Mar. 2009; 193 pages.
*Nokia of America Corporation v. Blackberry Ltd.*, "Nokia of America Corporation's Petition for Inter Partes Review," Case [[Unassigned]], U.S. Pat. No. 9,253,772, dated Feb. 6, 2018, 77 pages.
*Nokia of America Corporation v. Blackberry Limited*, "Patent Owner's Preliminary Response to Petition for Inter Partes Review of U.S. Pat. No. 9,253,772," Case: IPR2018-00583, U.S. Pat. No. 9,253,772 on May 23, 2018, 39 pages.
*Nokia of America Corporation v. Blackberry Limited*, "Declaration of Michael D. Kotzin, Ph.D.," Case IPR2018-00583, U.S. Pat. No. 9,253,772, on May 23, 2018, 38 pages.
*Nokia of American Corporation v Blackberry Limited*, "Decision: Denying Inter Partes Review," Paper 11, Case IPR2018-00583, U.S. Pat. No. 9,253,772, entered: Aug. 21, 2018, 12 pages.
3GPP R1-090984, 3GPP TSG RAN WG1 Meeting #56, "Initial Uplink Access Procedure in LTE-Advanced," Agenda Item 12.1; Source ZTE, Athens, Greece, Feb. 9-13, 2009, 5 pages.
3GPP R1-093048; 3GPP TSG RAN WG1 Meeting #58, "Improvements on Control Channel for Carrier Aggregation," Agenda Item 15.4, Source: Huawei, Shenzhen, China, Aug. 24-28, 2009, 4 pages.
ZTE, "Initial Uplink Access Procedure in LTE-Advanced, " 3GPP TSG RAN WG1 Meeting #56 (R1-090879), Athens, Greece, Feb. 9-13, 2009, 4 pages.
LG Electronics, "Initial Access Procedure in LTE-Advanced, " 3GPP TSG RAN WG1 Meeting #55bis (R1-090210), Ljubljana, Slovenia, Jan. 12-16, 2009, 5 pages.
Nokia Corporation, "RACH and Carrier Aggregation," 3GPP TSG-RAN WG2 Meeting #67bis (R2-095898), Miyazaki, Japan, Oct. 12-16, 2009, 3 pages.
Catt, "Allocation of C-RNTI in CA" 3GPP TSG RAN WG2 Meeting #67, R2-094323, Shenzhen, China, Aug. 24-28, 2009, 2 pages.
NEC, "Carrier Aggregation and Cell ID" 3GPP TSG-RAN WG2 #67, R2-094625, Shenzhen, China, Aug. 24-28, 2009, 4 pages.
Panasonic, "Discussion on PUCCH Coordination for UL CoMP" 3GPP TSG RAN WG1 Meeting #55bis, R1-090262, Ljubljana, Slovenia, Jan. 12-16, 2009, 2 pages.
Texas Instruments, "Views on Cross-Carrier Resource Assignment" 3GPP TSG RAN WG1 #58, R1-093595, Aug. 24-28, 2009, 2 pages.
ZTE, "Designing Issues for Carrier Aggregation" 3GPP TSG-RAN WG1, Meeting #58, R1-093702, Shenzhen, China, Aug. 24-28, 2009, 4 pages.
ZTE, "Primary and Secondary PDCCH Design for LTE-A" 3GPP TSG-RAN WG1 Meeting #57, R1-091707, San Francisco, USA, May 4-8, 2009, 12 pages.
Office Action in Canadian Appln. No. 2775313, mailed on May 3, 2016, 4 pages.
Office Action in Canadian Appln. No. 2775371, mailed on Oct. 14, 2016, 3 pages.
Notice of Allowance in Canadian Appln. No. 2775305, mailed on Dec. 8, 2016, 2 pages.

(56) References Cited

OTHER PUBLICATIONS

Office Action in Canadian Appln. No. 2775313, mailed on Apr. 10, 2017, 5 pages.
Office Action in Canadian Appln. No. 2775313, mailed on Apr. 9, 2018, 4 pages.
Office Action in Canadian Appln. No. 2,775,313, mailed on Mar. 6, 2019, 4 pages.
Office Action in Canadian Appln. No. 2775313, mailed on Mar. 12, 2020, 5 pages.
Office Action in Canadian Appln. No. 2775313, mailed on Dec. 2, 2020, 4 pages.
Office Action in Canadian Appln. No. 2775313, mailed on Sep. 20, 2021, 4 pages.
Office Action in Canadian Appln. No. 2775313, mailed on Jul. 25, 2022, 4 pages.
Office Action in Canadian Appln. No. 2775313, mailed on Apr. 12, 2023, 5 pages.
Office Action in Chinese Appln. No. 201080053479.5, mailed on Mar. 4, 2016, 4 pages.
Office Action in Chinese Appln. No. 201610220630.9, mailed on Jun. 4, 2018, 5 pages.
European Extended European Search Report in European Application No. 10818188.4, mailed on Mar. 5, 2013, 17 pages.
Extended European Search Report in European Appln. No. 12194086.0, mailed on Jun. 28, 2016, 11 pages.
Extended European Search Report in European Appln. No. 12194093.6, mailed on Jun. 27, 2016, 9 pages.
Extended European Search Report in European Appln. No. 10819561.1, mailed on Dec. 21, 2016, 11 pages.
Communication Pursuant to Article 94(3) EPC in European Appln. No. 10768313.8, mailed on Mar. 23, 2017, 5 pages.
Communication Pursuant to Article 94(3) EPC in European Appln. No. 10818188.4, mailed on May 26, 2017, 6 pages.
Communication Pursuant to Article 94(3) EPC in European Appln. No. 12194093.6, mailed on Jul. 6, 2017, 6 pages.
Communication Pursuant to Article 94(3) EPC in European Appln. No. 12194086.0, mailed on Jan. 5, 2018, 8 pages.
Communication Pursuant to Article 94(3) EPC in European Appln. No. 10768313.8, mailed on Mar. 15, 2018, 9 pages.
Communication Pursuant to Article 94(3) EPC in European Appln. No. 12194086.0, mailed on Dec. 11, 2018, 9 pages.
Communication Pursuant to Article 94(3) EPC in European Appln. No. 10768313.8, mailed on Feb. 7, 2019, 7 pages.
Extended European Search Report in European Appln. No. 18213147.4, mailed on Mar. 25, 2019, 13 pages.
Communication Pursuant to Article 94 (3) EPC in European Appln. No. 12194086.0, mailed on Oct. 9, 2019, 9 pages.
Communication Pursuant to Article 94 (3) EPC in European Appln. No. 18213147.4, mailed on Mar. 20, 2020, 6 pages.
Summons to Attend Oral Proceedings Pursuant to Rule 115 (1) EPC in European Appln. No. 10768313.8, mailed on Dec. 10, 2019, 10 pages.
Summons to Attend Oral Proceedings Pursuant to Rule 115 (1) EPC in European Appln. No. 10768313.8, mailed on Apr. 20, 2020, 10 pages.
Summons to Attend Oral Proceedings Pursuant to Rule 115 (1) EPC in European Appln. No. 10768313.8, mailed on Sep. 23, 2020, 9 pages.
Extended European Search Report in European Appln. No. 21151829.5, mailed on May 6, 2021, 13 pages.
Summons to Attend Oral Proceedings Pursuant to Rule 115(1) EPC issued in European Application. No. 18213147.4, mailed on Jul. 20, 2021, 8 pages.
Extended European Search Report in European Appln. No. 23185051.2, mailed, mailed on Dec. 14, 2023, 14 pages.
International Search Report and Written Opinion in International Appln. No. PCT/US2010/050218, mailed on May 30, 2011, 29 pages.
International Preliminary Report on Patentability in International Appln. No. PCT/US2010/050218, mailed on Apr. 5, 2012, 20 pages.
Partial International Search Report in International Appln. No. PCT/US2010/050232, mailed on Mar. 31, 2011, 3 pages.
International Search Report and Written Opinion in International Appln. No. PCT/US2010/050232, mailed on Jun. 6, 2011, 14 pages.
Written Opinion of the International Preliminary Examining Authority in International Appln. No. PCT/US2010/050232, mailed on Apr. 11, 2012, 9 pages.
International Preliminary Report on Patentability in International Appln. No. PCT/US2010/050232, mailed on Jun. 5, 2012, 32 pages.
International Search Report and Written Opinion in International Appln. No. PCT/US2010/050263, mailed on Nov. 23, 2010, 7 pages.
International Preliminary Report on Patentability in International Appln. No. PCT/US2010/050263, mailed on Sep. 27, 2011, 4 pages.
International Search Report and Written Opinion in International Appln. No. PCT/CA2010/001486, mailed on Mar. 11, 2011, 10 pages.
Written Opinion of the International Preliminary Examining Authority in International Appln. No. PCT/CA2010/001486, mailed on Dec. 22, 2011, 10 pages.
International Preliminary Report on Patentability in International Appln. No. PCT/CA2010/001486, mailed on Feb. 20, 2012, 18 pages.
Non-Final Office Action in U.S. Appl. No. 15/436,251, mailed on Sep. 11, 2018, 13 pages.
Non-Final Office Action in U.S. Appl. No. 15/452,497, mailed on Dec. 12, 2018, 17 pages.
Notice of Allowance in U.S. Appl. No. 15/436,251, mailed on May 22, 2019, 32 pages.
Advisory Action in U.S. Appl. No. 15/452,497, mailed on Jul. 23, 2019, 2 pages.
Final office action in U.S. Appl. No. 15/452,497, mailed on May 24, 2019, 35 pages.
Non-Final office action in U.S. Appl. No. 15/452,497, mailed on Oct. 29, 2019, 26 pages.
Notice of Allowance in U.S. Appl. No. 15/436,251, mailed on Dec. 6, 2019, 28 pages.
Notice of Allowance in U.S. Appl. No. 15/436,251, mailed on Feb. 20, 2020, 15 pages.
Notice of Allowance in U.S. Appl. No. 15/452,497, mailed on Mar. 6, 2020, 16 pages.
Notice of Allowance in U.S. Appl. No. 15/452,497, mailed on Apr. 23, 2020, 6 pages.
Notice of Allowance in U.S. Appl. No. 15/452,497, mailed on Jul. 13, 2020, 17 pages.
Non-Final Office Action U.S. Appl. No. 17/083,749, mailed on May 4, 2023, 33 pages.
Notice of Allowance in U.S. Appl. No. 17/083,749, mailed on Aug. 10, 2023, 9 pages.

* cited by examiner

FIG. 12

```
                              RadioResourceConfigDedicated
    The IE RadioResourceConfigDedicated is used to setup/modify/release RBs, to modify the MAC
    main configuration, to modify the SPS configuration and to modify dedicated physical configuration.
                        RadioResourceConfigDedicated information element
-- ASN1START RadioResourceConfigDedicated ::=    SEQUENCE {
    srb-ToAddModList                SRB-ToAddModList            OPTIONAL,   -- Cond HO-Conn
    drb-ToAddModList                DRB-ToAddModList            OPTIONAL,   -- Cond HO-
toEUTRA
    drb-ToReleaseList               DRB-ToReleaseList           OPTIONAL,   -- Need ON
    mac-MainConfig                  CHOICE {
        explicitValue                   MAC-MainConfig,
        defaultValue                    NULL
    }       OPTIONAL,                                                       -- Cond HO-
toEUTRA2
    sps-Config                      SPS-Config                  OPTIONAL,   -- Need ON
    physicalConfigDedicated         PhysicalConfigDedicated     OPTIONAL,   -- Need ON
    ...
    componentCarrierConfig          ComponentCarrierConfig      OPTIONAL    -- Need ON }
SRB-ToAddModList ::=                SEQUENCE (SIZE (1..2)) OF SRB-ToAddMod
SRB-ToAddMod ::= SEQUENCE {
    srb-Identity                    INTEGER (1..2),
    rlc-Config                      CHOICE {
        explicitValue                   RLC-Config,
        defaultValue                    NULL
    }       OPTIONAL,                                                       -- Cond Setup
    logicalChannelConfig            CHOICE {
        explicitValue                   LogicalChannelConfig,
        defaultValue                    NULL
    }       OPTIONAL,                                                       -- Cond Setup
    ...
}
DRB-ToAddModList ::=                SEQUENCE (SIZE (1..maxDRB)) OF DRB-ToAddMod
DRB-ToAddMod ::=    SEQUENCE {
    eps-BearerIdentity              INTEGER (0..15)             OPTIONAL,   -- Cond DRB-Setup
    drb-Identity                    DRB-Identity,
    pdcp-Config                     PDCP-Config                 OPTIONAL,   -- Cond PDCP
    rlc-Config                      PDCP-Config                 OPTIONAL,   -- Cond Setup
    logicalChannelIdentity          INTEGER (3..10)             OPTIONAL,   -- Cond DRB-Setup
    logicalChannelConfig            LogicalChannelConfig        OPTIONAL,   -- Cond Setup
    ...
}
DRB-ToReleaseList ::=               SEQUENCE (SIZE (1..maxDRB)) OF DRB-Identity
-- ASN1STOP
```

FIG. 12
(CONTINUED)

| RadioResourceConfigDedicated field descriptions |
|---|
| srb-Identity<br>Value 1 is applicable for SRB1 only.<br>Value 2 is applicable for SRB2 only. |
| rlc-Config<br>For SRBs a choice is used to indicate whether the RLC configuration is signalled explicitly or set to the values defined in the default RLC configuration for SRB1 in 9.2.1.1 or for SRB2 in 9.2.1.2. RLC AM is the only applicable RLC mode for SRB1 and SRB2. E-UTRAN does not reconfigure the RLC mode of DRBs, and may reconfigure the UM RLC SN field size only upon handover within E-UTRA or upon the first reconfiguration after RRC connection re-establishment. |
| mac-MainConfig<br>Although the ASN.1 includes a choice that is used to indicate whether the mac-MainConfig is signalled explicitly or set to the default MAC main configuration as specified in 9.2.2, EUTRAN does not apply "*defaultValue*". |

| sps-Config<br>The default SPS configuration is specified in 9.2.3. |
|---|
| physicalConfigDedicated<br>The default dedicated physical configuration is specified in 9.2.4. |
| logicalChannelConfig<br>For SRBs a choice is used to indicate whether the logical channel configuration is signalled explicitly or set to the default logical channel configuration for SRB1 as specified in 9.2.1.1 or for SRB2 as specified in 9.2.1.2. |
| logicalChannelIdentity<br>The logical channel identity for both UL and DL. |
| componentCarrierConfig<br>the configuration of the component carriers in the case that carrier aggregation is used. |

| Conditional presence | Explanation |
|---|---|
| DRB-Setup | The field is mandatory present if the corresponding DRB is being set up (including bearer setup at handover to E-UTRA); otherwise it is not present. |
| PDCP | The field is mandatory present if the corresponding DRB is being setup; the field is optionally present, need ON, upon handover within E-UTRA and upon the first reconfiguration after re-establishment; otherwise it is not present. |
| Setup | The field is mandatory present if the corresponding SRB/DRB is being setup; otherwise the field is optionally present, need ON. |
| HO-Conn | The field is mandatory present in case of handover to E-UTRA and to only establish SRB1 in case of RRC connection establishment; otherwise the field is optionally present, need ON. |
| HO-toEUTRA | The field is mandatory present in case of handover to E-UTRA; In case of RRC connection establishment and RRC connection re-establishment the field is not present; otherwise the field is optionally present, need ON. |
| HO-toEUTRA2 | The field is mandatory present in case of handover to E-UTRA; otherwise the field is optionally present, need ON. |

FIG. 12
(CONTINUED)

ComponentCarrierConfig

The IE *ComponentCarrierConfig* is used to specify the configuration of the component carriers in the case that carrier aggregation is used.

ComponentCarrierConfig information element

```
-- ASN1START
ComponentCarrierConfig ::=              SEQUENCE {
    componentCarrierToAddModList        SEQUENCE (SIZE (1..MaxCC)) OF SEQUENCE {
        physicalComponentCarrierIndex   INTEGER {0..7}
        logicalComponentCarrierIndex    INTEGER {0..7}
        componentCarrierSet             ENUMERATED {candidate, active}
        sibType1Info                    SEQUENCE {
            cellIdentity                CellIdentity,
            csg-Indication              BOOLEAN,
            csg-Identity                BIT STRING (SIZE (27)) OPTIONAL -- Need OR
        },
        dl-CarrierFreq                  ARFCN-ValueEUTRA,
        ul-CarrierFreq                  ARFCN-ValueEUTRA,
        dl-Bandwidth                    ENUMERATED {n6, n15, n25, n50, n75, n100, etc},
        ul-Bandwidth                    ENUMERATED {n6, n15, n25, n50, n75, n100, etc},
        radioResourceConfigCommon       RadioResourceConfigCommonSIB,
        carrierType                     ENUMERATED {typeA, typeB},
        pdcchMonitoringCarrier          BOOLEAN,
        systemInformationScheduling     SEQUENCE {
            schedulingInfoList          SchedulingInfoList,
            si-WindowLength             ENUMERATED {ms1, ms2, ms5, ms10, ms15, ms20, ms40},
            systemInfoValueTag          INTEGER (0..31),
        } OPTIONAL,
        siPaging-Config1                SEQUENCE {
            siChangeIndicationPagingCycle   ENUMERATED {rf32, rf64, rf128, rf256},
            siChangeIndicationPagingFrame   INTEGER (0..siIndicationPagingCycle),
            siChangeIndicationPagingOccasion INTEGER (0..9),
        } OPTIONAL,
        siPaging-Config2                SEQUENCE {
            siChangeIndicationPagingCyclePeriod INTEGER (1..maxPagingPeriod),
            siChangeIndicationPagingFrame   INTEGER (1..maxPagingPeriod x PagingCycle on Anchor Carrier) OPTIONAL,
            siChangeIndicationPagingFrame   INTEGER (0..9)    OPTIONAL,
        } OPTIONAL,
        virtualPCI                      PhysCellId         OPTIONAL,
        componentCarrier-C-RNTI         C-RNTI             OPTIONAL
    }
    componentCarrierToReleaseList ::=   SEQUENCE (SIZE (1..maxCC)) OF SEQUENCE {
        logicalComponentCarrierIndex    INTEGER (0..7)
    }
}
-- ASN1STOP
```

| ComponentCarrierConfig field descriptions |
|---|
| phyiscalComponentCarrierIndex<br>A carrier index associated with a carrier in the eNB. It is unique among the carriers that serve the same geographical area within the eNB. |
| logicalComponentCarrierIndex<br>A logical carrier index that is associated with a carrier assigned to the UE. It is unique from a UE's perspective. |
| componentCarrierSet<br>To indicate if the component carrier belongs to the Active CC set and Candidate CC set or just the Candidate CC set. |
| carrierType<br>To indicate if the component carrier is a Type A or Type B carrier. |
| pdcchMonitoringCarrier<br>To indicate if the component carrier is a PDCCH monitoring carrier |
| systemInformationScheduling<br>Scheduling information for SI on a Type B component carrier. |
| siChangeIndicationPagingCycle<br>Paging cycles for the occurrence of paging occasions with SI change indication on the component carrier |
| siChangeIndicationPagingFrame<br>The radio frame within the paging cycle where the paging occasion with SI change indication occurs on the component carrier. |
| siChangeIndicationPagingOccasion<br>The subframe within the *siChangeIndicationPagingFrame* where the paging message with SI change indication is sent on the component carrier. |
| siChangeIndicationPagingCyclePeriod<br>The period of the paging cycles for the occurrence of paging occasions with SI change indication on the component carrier in multiples of the paging cycle period on the anchor carrier. 1 means the period is the same as that of the anchor carrier, 2 means the period is 2 times that of the anchor carrier and so on and so forth. |
| virtualPCI<br>Virtual PCI of a Type B carrier if a Type B carrier is assigned. |
| componentCarrier-C-RNTI<br>C-RNTI of the UE for the component carrier. |

FIG. 12
(CONTINUED)

SystemInformationBlockType12

The IE *SystemInformationBlockType12* is transmitted by a cell on a Type A carrier and contains information about other component carrier.

SystemInformationBlockType12 information element

-- ASN1START

```
SystemInformationBlockType12 ::=    SEQUENCE {
    componentCarrierList            SEQUENCE (SIZE (1..MaxCC)) OF SEQUENCE {
        physicalComponentCarrierIndex   INTEGER {0..7} sibType1Info                SEQUENCE {
            cellIdentity                CellIdentity,
            csg-Indication              BOOLEAN,
            csg-Identity                BIT STRING (SIZE (27)) OPTIONAL -- Need OR
        },
        dl-CarrierFreq              ARFCN-ValueEUTRA,
        ul-CarrierFreq              ARFCN-ValueEUTRA,
        dl-Bandwidth                ENUMERATED {n6, n15, n25, n50, n75, n100, etc},
        ul-Bandwidth                ENUMERATED {n6, n15, n25, n50, n75, n100, etc},
        radioResourceConfigCommon   RadioResourceConfigCommonSIB,
        carrierType                 ENUMERATED {typeA, typeB},
        pdcchMonitoringCarrier      BOOLEAN,
        systemInformationScheduling SEQUENCE {
            schedulingInfoList          SchedulingInfoList,
            si-WindowLength             ENUMERATED {ms1, ms2, ms5, ms10, ms15, ms20, ms40},
            systemInfoValueTag          INTEGER (0..31),
        } OPTIONAL,
        siPaging-Config             SEQUENCE {
            siChangeIndicationPagingCycle   ENUMERATED {rf32, rf64, rf128, rf256},
            siChangeIndicationPagingFrame   INTEGER (0..siIndicationPagingCycle),
            siChangeIndicationPagingOccasion INTEGER (0..9),
        } OPTIONAL,
        virtualPCI                  PhysCellId      OPTIONAL,
    }
}
```

-- ASN1STOP

```
                                 RadioResourceConfigDedicated
     The IE RadioResourceConfigDedicated is used to setup/modify/release RBs, to modify the MAC
      main configuration, to modify the SPS configuration and to modify dedicated physical configuration.
                            RadioResourceConfigDedicated information element
-- ASN1START
RadioResourceConfigDedicated ::=     SEQUENCE {
    srb-ToAddModList                 SRB-ToAddModList              OPTIONAL,     -- Cond HO-Conn
    drb-ToAddModList                 DRB-ToAddModList              OPTIONAL,     -- Cond HO-toEUTRA
    drb-ToReleaseList                DRB-ToReleaseList             OPTIONAL,     -- Need ON
    mac-MainConfig                   CHOICE {
        explicitValue                    MAC-MainConfig,
        defaultValue                     NULL
    }       OPTIONAL,                                                            -- Cond HO-toEUTRA2
    sps-Config                       SPS-Config                    OPTIONAL,     -- Need ON
    physicalConfigDedicated          PhysicalConfigDedicated       OPTIONAL,     -- Need ON
    ...
    componentCarrierActivationInfo   ComponentCarrierActivationInfo           OPTIONAL
}

SRB-ToAddModList ::=                 SEQUENCE (SIZE (1 .. 2)) OF SRB-ToAddMod
SRB-ToAddMod ::= SEQUENCE {
    srb-Identity                     INTEGER (1..2),
    rlc-Config                       CHOICE {
        explicitValue                    RLC-Config,
        defaultValue                     NULL
    }       OPTIONAL,                                                            -- Cond Setup
    logicalChannelConfig             CHOICE {
        explicitValue                    LogicalChannelConfig,
        defaultValue                     NULL
    }       OPTIONAL,                                                            -- Cond Setup
    ...
}

DRB-ToAddModList ::=                 SEQUENCE (SIZE (1 .. maxDRB)) OF DRB-ToAddMod
DRB-ToAddMod ::=      SEQUENCE {
    eps-BearerIdentity               INTEGER (0..15)               OPTIONAL,     -- Cond DRB-Setup
    drb-Identity                     DRB-Identity,
    pdcp-Config                      PDCP-Config                   OPTIONAL,     -- Cond PDCP
    rlc-Config                       RLC-Config                    OPTIONAL,     -- Cond Setup
    logicalChannelIdentity           INTEGER (3..10)               OPTIONAL,     -- Cond DRB-
```

```
Setup
    logicalChannelConfig           LogicalChannelConfig          OPTIONAL,      -- Cond Setup
    ...
}

DRB-ToReleaseList ::=              SEQUENCE (SIZE (1..maxDRB)) OF DRB-Identity

ComponentCarrierActivationInfo ::=  SEQUENCE (SIZE (1..macXX)) OF SEQUENCE{
        logicalComponentCarrierIndex              INTEGER (0..7)
        componentCarrierSet                       ENUMERATED {inactive, active}    OPTIONAL,
        actionTime             SEQUENCE{
            systemFrameNumber       BIT STRING (SIZE (10)),
            subFrameNumber          INTEGER (0..9)
        } OPTIONAL,
        anchorCarrierIndication    BOOLEAN
        radioResourceConfigCommon  RadioResourceConfigCommonSIB     OPTIONAL

}
-- ASN1STOP
```

| RadioResourceConfigDedicated field descriptions |
|---|
| componentCarrierSet<br>If the field is set to active then the component carrier is active (i.e. it is member of the Active Component Carrier Set).<br>If the field is set to inactive then the component carrier is inactive (i.e. it is a member of the Candidate Component Carrier Set). |
| systemFrameNumber<br>The 10-bit SFN of the radio frame on which the component carrier is activated. |
| subFrameNumber<br>The subframe within the radio frame on which the component carrier is activated. |
| anchorCarrierIndication<br>Set to 'True' if the component carrier is the anchor carrier at the actionTime. Set to 'False' otherwise. |

FIG. 14
(CONTINUED)

6.1.3.x Component Carrier Control MAC Control Element
The Component Carrier Control MAC control element (see Fig. 10) is identified by MAC PDU subheader with LCID as specified in table 6.2.1-2.

It has a fixed size and consists of 8 fields A0 to A7 as well as two additional fields defined as follows (figure 6.1.3.x-1):

A$n$: If the field is set to 1 then the component carrier with logical or physical component carrier index n is active (i.e. it is a member of the Active Component Carrier Set). If the field is set to 0 then the component carrier with logical/physical component carrier index n is inactive (i.e. it is a member of the Candidate Component Carrier Set).

LSB_SFN: Four LSB of the SFN for next radio frame on which the UE should enable signal reception on the component carriers indicated in A0 to A7.

SubframeIndex: The index of the subframe within the radio frame on which the UE should enable signal reception on the component carriers indicated in A0 to A7.

6.2.1 MAC header for DL-SCH and UL-SCH

The MAC header is of variable size and consists of the following fields:
- LCID: The Logical Channel ID field identifies the logical channel instance of the corresponding MAC SDU or the type of the corresponding MAC control element or padding as described in tables 6.2.1-1 and 6.2.1-2 for the DL and UL-SCH respectively. There is one LCID field for each MAC SDU, MAC control element or padding included in the MAC PDU. In addition to that, one or two additional LCID fields are included in the MAC PDU, when single-byte or two-byte padding is required but cannot be achieved by padding at the end of the MAC PDU. The LCID field size is 5 bits;
- L: The Length field indicates the length of the corresponding MAC SDU in bytes. There is one L field per MAC PDU subheader except for the last subheader and subheaders corresponding to fixed-sized MAC control elements. The size of the L field is indicated by the F field;
- F: The Format field indicates the size of the Length field as indicated in table 6.2.1-3. There is one F field per MAC PDU subheader except for the last subheader and subheaders corresponding to fixed-sized MAC control elements. The size of the F field is 1 bit. If the size of the MAC SDU is less than 128 bytes, the UE shall set the value of the F field to 0, otherwise the UE shall set it to 1;
- E: The Extension field is a flag indicating if more fields are present in the MAC header or not. The E field is set to "1" to indicate another set of at least R/R/E/LCID fields. The E field is set to "0" to indicate that either a MAC SDU, a MAC control element or padding starts at the next byte;
- R: Reserved bit, set to "0".

FIG. 15

The MAC header and subheaders are octet aligned.

Values of LCID for DL-SCH

| Index | LCID values |
|---|---|
| 00000 | CCCH |
| 00001-01010 | Identity of the logical channel |
| 01011-11010 | Reserved |
| 11011 | Component Carrier Control |
| 11100 | UE Contention Resolution Identity |
| 11101 | Timing Advance Command |
| 11110 | DRX Command |
| 11111 | Padding |

Values of LCID for UL-SCH

| Index | LCID values |
|---|---|
| 00000 | CCCH |
| 00001-01010 | Identity of the logical channel |
| 01011-11001 | Reserved |
| 11010 | Power Headroom Report |
| 11011 | C-RNTI |
| 11100 | Truncated BSR |
| 11101 | Short BSR |
| 11110 | Long BSR |
| 11111 | Padding |

Values of F field:

| Index | Size of Length field (in bits) |
|---|---|
| 0 | 7 |
| 1 | 15 |

FIG. 15
(CONTINUED)

```
                              SystemInformationBlockType1
SystemInformationBlockType1 contains information relevant when evaluating if a UE is allowed to access a cell and
   defines the scheduling of other system information.
Signalling radio bearer: N/A

RLC-SAP: TM

Logical channel: BCCH

Direction: E-UTRAN to UE

SystemInformationBlockType1 message
            ASN1START
SystemInformationBlockType1      ::=       SEQUENCE {
   cellAccessRelatedInfo                      SEQUENCE {
     plmn-IdentityList                           PLMN-IdentityList,
     trackingAreaCode                            TrackingAreaCode,
     cellIdentity                                CellIdentity,
     cellBarred                                  ENUMERATED {barred, notBarred},
     intraFreqReselection                        ENUMERATED {allowed, notAllowed},
     csg-Indication                              BOOLEAN,
     csg-Identity                                BIT STRING (SIZE (27))  OPTIONAL  -- Need OR
   },
   cellSelectionInfo                          SEQUENCE {
     q-RxLevMin                                  Q-RxLevMin,
     q-RxLevMinOffset                            INTEGER (1..8)          OPTIONAL  -- Need OP
   },
   p-Max                                      P-Max                      OPTIONAL,    -- Need OP
   freqBandIndicator                          INTEGER (1..64),
   schedulingInfoList                         SchedulingInfoList,
   tdd-Config                                 TDD-Config                 OPTIONAL,  -- Cond TDD
   si-WindowLength                            ENUMERATED {
                                                ms1, ms2, ms5, ms10, ms15, ms20,
                                                ms40},
   systemInfoValueTag                         INTEGER (0..31),
   nonCriticalExtension                       SEQUENCE {
     cellBarred2                                 ENUMERATED {barred, notBarred}   OPTIONAL,
     nonCriticalExtension                        SEQUENCE {}                OPTIONAL   -- Need OP
   }             OPTIONAL        -- Need OP
}

PLMN-IdentityList ::=                        SEQUENCE (SIZE (1..6)) OF PLMN-IdentityInfo
```

FIG. 16

```
PLMN-IdentityInfo  ::=              SEQUENCE {
  plmn-Identity                     PLMN-Identity,
  cellReservedForOperatorUse        ENUMERATED
  {reserved, notReserved}
}

SchedulingInfoList  ::=  SEQUENCE (SIZE (1..maxSI-Message))  OF SchedulingInfo

SchedulingInfo  ::=  SEQUENCE {
  si-Periodicity                    ENUMERATED {
                                      rf8, rf16, rf32, rf64, rf128, rf256, rf512},
  sib-MappingInfo                   SIB-MappingInfo
}
SIB-MappingInfo  ::=  SEQUENCE (SIZE (0..maxSIB-1))  OF SIB-Type SIB-Type  ::=                       ENUMERATED {
                                      sibType3, sibType4, sibType5, sibType6,
                                      sibType7, sibType8, sibType9, sibType10,
                                      sibType11, spare7, spare6, spare5,
                                      spare4, spare3, spare2, spare1, ...}
                ASN1STOP
```

| SystemInformationBlockType1 field descriptions |
|---|
| plmn-IdentityList<br>List of PLMN identities. The first listed PLMN-Identity is the primary PLMN. |
| cellReservedForOperatorUse<br>As defined in TS 36.304 [4]. |
| trackingAreaCode<br>A *trackingAreaCode* that is common for all the PLMNs listed. |
| cellBarred<br>'barred' means the cell is barred, as defined in TS 36.304 [4]. |
| cellBarred2<br>If this IE is present then the UE ignores the value of *cellBarred* and acts on the value of *cellBarred2*.<br>'barred' means the cell is barred, as defined in TS 36.304 [4]. |
| intraFreqReselection<br>Used to control cell reselection to intra-frequency cells when the highest ranked cell is barred, or treated as barred by the UE, as specified in TS 36.304 [4]. |
| Csg-Indication<br>If set to TRUE the UE is only allowed to access the cell if the CSG identity matches an entry in the allowed CSG list that the UE has stored. |

FIG. 16
(CONTINUED)

| |
|---|
| q-RxLevMinOffset<br>Parameter $Q_{rxlevminoffset}$ in 36.304 [4]. Actual value $Q_{rxlevminoffset}$ = IE value * 2 [dB]. If absent, apply the (default) value of 0 [dB] for $Q_{rxlevminoffset}$. Affects the minimum required Rx level in the cell. |
| p-Max<br>Value applicable for the cell. |
| freqBandIndicator<br>Defined in TS 36.101 [42, table 5.5-1]. |
| Si-Periodicity<br>Periodicity of the SI-message in radio frames, such that rf8 denotes 8 radio frames, rf16 denotes 16 radio frames, and so on. |
| Sib-MappingInfo<br>List of the SIBs mapped to this *SystemInformation* message. There is no mapping information of SIB2; it is always present in the first *SystemInformation* message listed in the *schedulingInfoList* list. |
| Si-WindowLength<br>Common SI scheduling window for all SIs. Unit in milliseconds, where ms1 denotes 1 millisecond, ms2 denotes 2 milliseconds and so on. |
| systemInfoValueTag<br>Common for all SIBs other than MIB, SIB1, SIB10 and SIB11. |
| Csg-Identity<br>Identity of the Closed Subscriber Group within the primary PLMN the cell belongs to. The IE is present in a CSG cell. |

| Conditional presence | Explanation |
|---|---|
| TDD | This field is mandatory present for TDD; it is not present for FDD and the UE shall delete any existing value for this field. |

FIG. 16
(CONTINUED)

SYSTEM AND METHOD FOR MULTI-CARRIER NETWORK OPERATION

CROSS-REFERENCE TO RELATED APPLICATIONS

This application is a continuation of U.S. application Ser. No. 17/083,749 filed on Oct. 29, 2020, which is a continuation of U.S. application Ser. No. 15/452,497 filed on Mar. 7, 2017, which is a continuation of U.S. application Ser. No. 13/498,318 filed on Sep. 25, 2012, which is a National Stage Entry under 37 U.S.C. 371 of PCT/US2010/050263 filed on Sep. 24, 2010 entitled "SYSTEM AND METHOD FOR MULTI-CARRIER NETWORK OPERATION", which claims priority to and incorporates by reference U.S. Provisional Patent Application No. 61/246,064 entitled "SYSTEM AND METHOD FOR MULTI-CARRIER NETWORK OPERATION", filed on Sep. 25, 2009, the entire contents of which are hereby incorporated by reference.

BACKGROUND

The present invention relates generally to data transmission in communication systems and more specifically to methods and systems for facilitating multi-carrier operation in a mobile communication system.

As used herein, the terms "user equipment" and "UE" can refer to wireless devices such as mobile telephones, personal digital assistants (PDAs), handheld or laptop computers, and similar devices or other user agents ("UAs") that have telecommunications capabilities. In some embodiments, a UE may refer to a mobile, wireless device. The term "UE" may also refer to devices that have similar capabilities but that are not generally transportable, such as desktop computers, set-top boxes, or network nodes.

In traditional wireless telecommunications systems, transmission equipment in a base station or other network node transmits signals throughout a geographical region known as a cell. As technology has evolved, more advanced equipment has been introduced that can provide services that were not possible previously. This advanced equipment might include, for example, an evolved universal terrestrial radio access network (E-UTRAN) node B (eNB) rather than a base station or other systems and devices that are more highly evolved than the equivalent equipment in a traditional wireless telecommunications system. Such advanced or next generation equipment may be referred to herein as long-term evolution (LTE) equipment, and a packet-based network that uses such equipment can be referred to as an evolved packet system (EPS). Additional improvements to LTE systems and equipment will eventually result in an LTE advanced (LTE-A) system. As used herein, the phrase "base station" will refer to any component, such as a traditional base station or an LTE or LTE-A base station (including eNBs), that can provide a UE with access to other components in a telecommunications system.

In mobile communication systems such as the E-UTRAN, a base station provides radio access to one or more UEs. The base station comprises a packet scheduler for dynamically scheduling downlink traffic data packet transmissions and allocating uplink traffic data packet transmission resources among all the UEs communicating with the base station. The functions of the scheduler include, among others, dividing the available air interface capacity between UEs, deciding the transport channel to be used for each UE's packet data transmissions, and monitoring packet allocation and system load. The scheduler dynamically allocates resources for Physical Downlink Shared Channel (PDSCH) and Physical Uplink Shared Channel (PUSCH) data transmissions, and sends scheduling information to the UAs through a control channel.

To facilitate communications, a plurality of different communication channels are established between a base station and a UE, among other channels, a Physical Downlink Control Channel (PDCCH). As the label implies, the PDCCH is a channel that allows the base station to send control signal to a UE for uplink and downlink data communications. To this end, the PDCCH is used to transmit scheduling assignment and control data packets referred to as Downlink Control Information (DCI) packets to the UE to indicate scheduling information to be used by the UE to receive downlink communication traffic packets on a Physical Downlink Shared Channel (PDSCH) or transmit uplink communication traffic packets on a Physical Uplink Shared Channel (PUSCH) or specific instructions to the UE (e.g. power control commands, an order to perform a random access procedure, or a semi-persistent scheduling activation or deactivation). A separate DCI packet may be transmitted by the base station to a UE for each traffic packet/sub-frame transmission.

In some cases, carrier aggregation can be used to support wider transmission bandwidths and increase the potential peak data rate for communications between a UE, base station and/or other network components. In carrier aggregation, multiple component carriers are aggregated and may be allocated in a sub-frame to a UE as shown in FIG. 1. FIG. 1 shows carrier aggregation in a communications network where each component carrier has a bandwidth of 20 MHz and the total system bandwidth is 100 MHz. As illustrated, the available bandwidth 100 is split into a plurality of carriers 102. UE 10 may receive or transmit on multiple component carriers (up to a total of five carriers 102 in the example shown in FIG. 1), depending on the UE's capabilities. In some cases, depending on the network deployment, carrier aggregation may occur with carriers 102 located in the same band and/or carriers 102 located in different bands. For example, one carrier 102 may be located at 2 GHz and a second aggregated carrier 102 may be located at 800 MHz.

In multi-carrier communications network implementations, various types of carriers can be defined. Backwards compatible carriers include carriers accessible to UEs that comply to a version or release of the specification prior to the version of release of the specification in which the support of carrier aggregation is added. In other words, backwards compatible carriers are accessible to UEs that are do not support and are not aware of carrier aggregation. Such UEs can be referred to as legacy UEs. For example, if carrier aggregation is added to LTE release 10, then backwards compatible carriers are accessible to UEs of earlier LTE releases such as LTE release 8 or LTE release 9. Backwards compatible carriers can be operated as a single carrier (stand-alone) or as a part of a carrier aggregation. In the case of frequency division duplexing (FDD) implementations, backwards compatible carriers may occur in pairs (e.g., DL (downlink) and UL (uplink) carrier pairs). Non-backwards compatible carriers are not accessible to UEs of earlier LTE releases, but are accessible to UEs of the LTE release that defines the operation of carrier aggregation. Non-backwards compatible carriers can be operated as a single carrier (stand-alone) if the non-backwards compatibility originates from the frequency duplex distance, or otherwise may be operated as a part of a carrier aggregation. An extension carrier cannot be operated as a single carrier (stand-alone), but must be a part of a component carrier set where at least one of the carriers in the set is a stand-alone-capable carrier. In multi-carrier networks, a UE DL Component Carrier Set includes the set of DL component carriers on which a UE may be scheduled to receive the PDSCH in the DL. Similarly, a UE UL Component Carrier Set includes the set of UL component carriers on which a UE may be scheduled to transmit the PUSCH in the UL.

Of the various carriers in a multi-carrier system, the carriers may generally be allocated into one of two types. Type A carriers are fully configured carriers that include all the sync channels and system information broadcasts necessary to allow all UEs to camp including legacy UEs and UEs that support or are aware of carrier aggregation. A Type A carrier is a backward compatible carrier if it supports legacy UEs. A Type A carrier is a non-backward compatible if it only supports UEs that support or aware of carrier aggregation. Type B carriers may not provide all the necessary system information broadcasts and may or may not include the sync channels. Type B carriers do not allow idle-mode UEs to camp. Similar to the extension carrier, Type B carriers may only serve RRC_CONNECTED UEs in carrier aggregation mode, i.e., a Type B carrier may not be a stand-alone carrier. Finally, Type B carriers may or may not include a PDCCH.

FIG. 2 is an illustration of an example network 50 that uses carrier aggregation. In FIG. 2, two base stations 52 and 54 (e.g., eNBs) communicate with several UEs. In this example, each of base stations 52 and 54 control 3 'cells'. In this illustration, the term cell may be used to refer to a certain geographical coverage area (although it should be noted that there may be small differences in coverage provided by the different carrier frequencies due to different propagation characteristics of the different frequencies). Cells A, B, C and D each operate using 3 different carrier frequencies 1, 2 and 3 and each carrier frequency further corresponding to a component carrier. Cell E operates using 2 different carrier frequencies and cell F operates using a single carrier frequency. The carrier frequencies used by each 'cell' depend on the deployment of the network and may be statically configured, or change infrequently. In the example, UEs 56 and 58 are both capable of operating using carrier aggregation. UE 58 is located within cell A and, as such, base station 52 may choose to use up to 3 carrier frequencies to communicate with UE 58. In contrast, UE 56 is located within cell F. Because cell F only provides a single carrier frequency, base station 54 communicates with UE 56 via a single carrier frequency only (e.g., carrier frequency 3).

FIG. 3 is an illustration of a multi-carrier network implementation and shows 4 component carriers (Frequencies 1-4) operated by the same base station (e.g., an eNB). As illustrated, the component carriers are not all adjacent in frequency and may even reside in different radio frequency bands. In this example, frequencies 1, 2 and 3 are Type A carriers, while frequency 4 is a Type B carrier. In this example, the base station has configured UE 60 to operate with frequency 3 as the UE's anchor carrier and frequency 4 as a non-anchor carrier of the UE. UE 62 is configured to operate with frequency 1 as the UE's anchor carrier and frequencies 2 and 3 as non-anchor carriers. During operation, the base station may reconfigure any of the UEs to change the anchor and non-anchor carriers upon which the UEs are operating (i.e. there may be a dynamic association between the UE and the carriers on which the UE is operating). In this example, UE 64 represents a UE that is not capable of operating in carrier aggregation mode. For example, UE 64 may be a UE that was built to an earlier version of the specification prior to the introduction of carrier aggregation. As such, UE 64 is configured to only operate using frequency 2.

In the example shown in FIG. 3, communication of user data and/or layer 3 control signaling (e.g., dedicated radio resource control (RRC) signaling) between the base station and UE 60 may use the anchor carrier (freq 3), the non anchor carrier (freq 4), or both. This behavior may be adjusted based upon the decisions of the scheduler within the base station.

Generally, in existing multi-carrier communications network implementations, although many different categories of component carriers (CCs) may be defined, the detailed operation of how a UE is assigned one or multiple of the CCs, the relationship across the multiple CCs and a UE, and the details of a downlink/uplink (DL/UL) CC set for a particular UE are not defined. Additional issues to be considered in -carrier aggregation implementations include whether a CC is qualified as a cell. Also, if a CC is qualified as a cell, the appropriate operation when a UE is assigned multiple CCs is undefined. Similarly, in multi-carrier implementations, existing standards fail to describe how the assignment and activation of a CC to a UE is performed, how a UE switches from one CC to another, how to define the CCs assigned to a particular UE, and how to scramble the data and control channels on each of the CCs assigned to the UE. Similarly, existing multi-carrier network implementations fail to provide mechanisms allowing a legacy UE to distinguish a non-backward compatible carrier from a backward compatible carrier.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 12 shows a Table 2.

FIG. 13 shows a Table 3.

FIG. 14 shows a Table 4.
FIG. 15 shows a Table 5.
FIG. 16 shows a Table 7.

DETAILED DESCRIPTION

Figure 1:
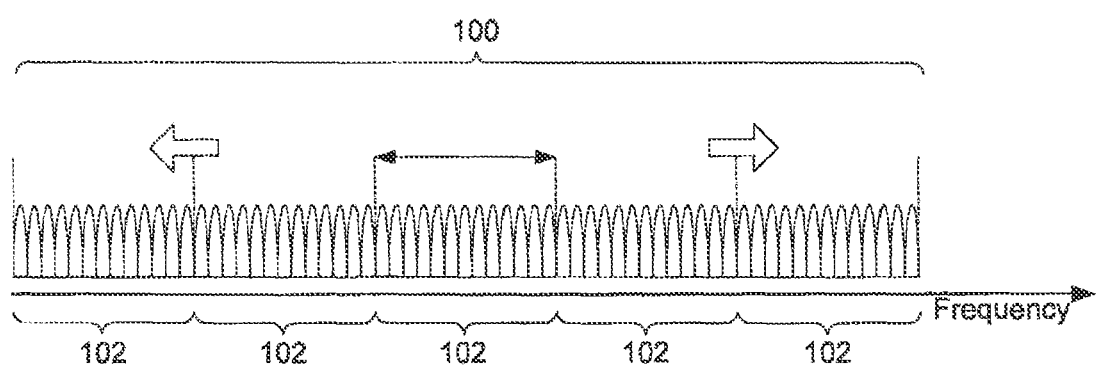
FIG. 1 shows carrier aggregation in a communications network where each component carrier has a bandwidth of 20 MHz and the total system bandwidth is 100 MHz.
Figure 2:
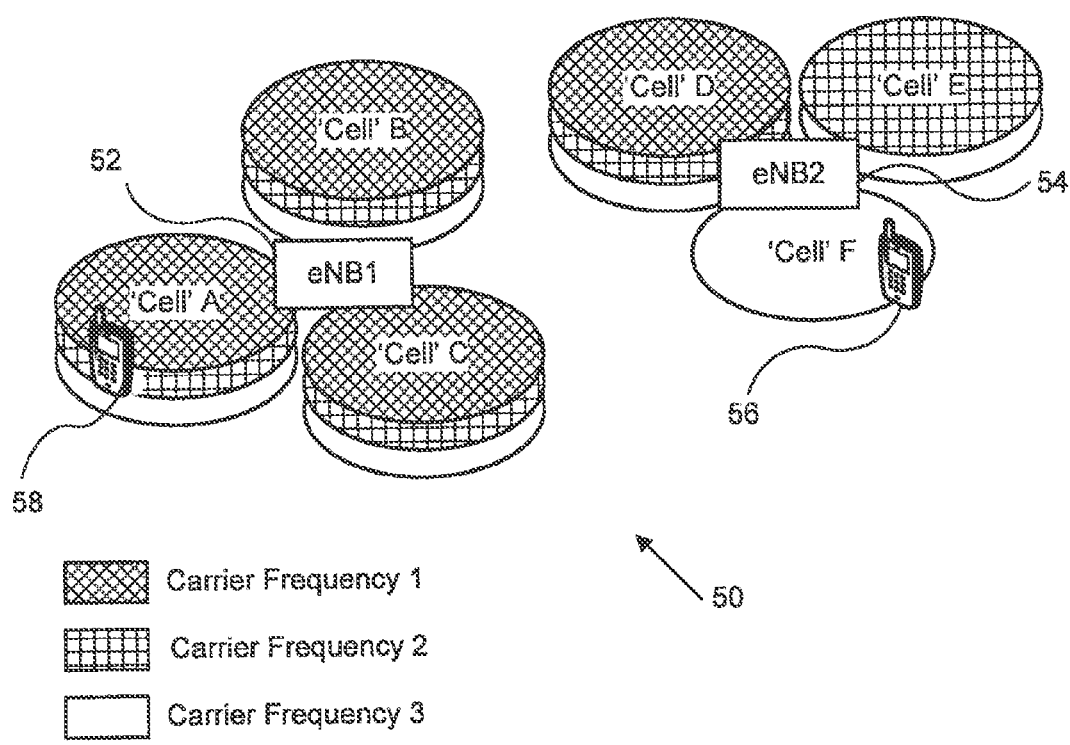
FIG. 2 is an illustration of an example network that implements carrier aggregation.
Figure 3:
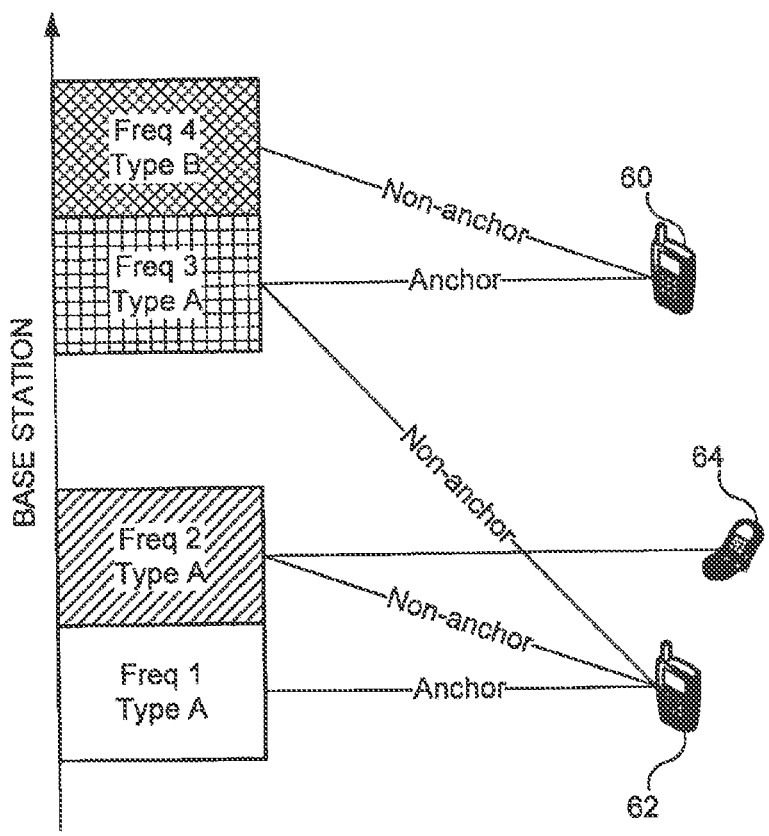
FIG. 3 is an illustration of a multi-carrier network implementation and shows 4 component carriers operated by the same base station (e.g., an eNB)

The present invention relates generally to data transmission in communication systems and more specifically to methods and systems for facilitating multi-carrier operation in a mobile communication system.

To this end, some embodiments include a method for receiving a system information (SI) update for at least one of a first component carrier (CC) and a second CC. The first and second CC are provided by a base station. The method includes receiving a paging message using the first CC. When the paging message contains a change notification, the method includes retrieving CC identification information from the paging message. The CC identification information identifies the second CC. The method includes receiving a system information block type 1 (SIB1) using the second CC. The SIB1 contains SI scheduling information for the second CC. The SI scheduling information defines a modification boundary. The method includes, during a subframe following the modification boundary, receiving an SIB2 using the second CC.

Other embodiments include a method for receiving a system information (SI) update for a first component carrier (CC). The first CC is provided by a base station. The method includes receiving a radio resource control (RRC) message from the base station, the RRC message identifying a paging occasion of the first CC. The method includes, during the paging occasion, receiving a paging message using the first CC, and, when the paging message contains a change notification, receiving at least one of a System Information Block Type 1 (SIB1) and a System Information Block Type 2 (SIB2) using the first CC.

Other embodiments include a method for transmitting a system information (SI) update for at least one of a first component carrier (CC) and a second CC. The first and second CC are provided by a base station. The method includes detecting an SI modification for the second CC, and transmitting a paging message using the first CC. The paging message includes a change notification and identification information of the second CC. The method includes transmitting a System Information Block Type 1 (SIB1) using the second CC. The SIB1 contains SI scheduling information for the second CC and the SI scheduling information defines a modification boundary. The method includes, during a subframe following the modification boundary, transmitting an SIB2 using the second CC.

Other embodiments include a method for receiving a system information (SI) update for at least one of a first component carrier (CC) and a second CC. The first and second CC are provided by a base station. The method includes receiving a paging message using the first CC. When the paging message contains a change notification the method includes retrieving identification information from the paging message. The identification information identifies the second CC. The method includes receiving first SI using the second CC. The first SI contains SI scheduling information for the second CC and the SI scheduling information defines a modification boundary. The method includes, during a subframe following the modification boundary, receiving second SI using the second CC.

Other embodiments include a method for receiving a component carrier (CC) allocation using a user equipment (UE). The method includes receiving a CC assignment from a base station, the CC assignment identifying a first CC provided by the base station. When the CC assignment includes an instruction to enable reception on the first CC, the method includes enabling signal reception on the first CC. When the CC assignment does not include an instruction to enable reception on the first CC, the method includes storing system information (SI) of the first CC, receiving a second transmission from the base station, the second transmission including an instruction to enable reception on the first CC, and using the stored SI to enable signal reception on the first CC.

Other embodiments include a method for receiving a component carrier (CC) allocation using a user equipment (UE). The method includes receiving a CC assignment from a base station, the CC assignment identifying a first CC provided by the base station. When the CC assignment does not include an instruction to enable reception on the first CC, the method includes receiving a second transmission from the base station, the second transmission including an instruction to enable reception on the first CC, and using system information (SI) of the first CC to enable signal reception on the first CC.

Other embodiments include a method for implementing channel scrambling in a multi-carrier network. The multi-carrier network includes a first component carrier (CC) and a second CC provided by a base station. The first CC has a cell identification (ID) and a Cell Radio Network Temporary Identifier (C-RNTI). The method includes receiving a virtual C-RNTI and a virtual cell ID from the base station, and using the virtual C-RNTI and the virtual cell ID to implement scrambling on the second CC.

Other embodiments include a method for implementing channel scrambling in a multi-carrier network. The multi-carrier network includes a first component carrier (CC) and a second CC provided by a base station. The first CC has a cell identification (ID) and a Cell Radio Network Temporary Identifier (C-RNTI). The method includes receiving control information using the first CC, the control information allocating a resource on the second CC, using the cell ID and C-RNTI of the first CC to generate a scrambling sequence, using the scrambling sequence to decode the control information received using the first CC, and using the resource allocated by the control information on the second CC.

Other embodiments include a method for implementing channel scrambling in a multi-carrier network. The multi-carrier network includes a first component carrier (CC) and a second CC provided by a base station. The first CC has a cell identification (ID) and a Cell Radio Network Temporary Identifier (C-RNTI). The method includes receiving control information using the first CC. When the control information allocates a resource on the first CC, the method includes using the cell ID and the C-RNTI of the first CC to generate a scrambling sequence for decoding the control information received using the first CC. When the control information allocates a resource on the second CC, the method includes using a virtual cell identification (ID) and a virtual Cell Radio Network Temporary Identifier (C-RNTI) of the second CC to generate a scrambling sequence for decoding the control information received using the first CC.

Other embodiments include a method for implementing channel scrambling in a multi-carrier network. The multi-carrier network includes a first component carrier (CC) and a second CC provided by a base station. The method includes receiving control information using the first CC, and performing blind decoding to decode the control information using at least one of a cell identification (ID) and a Cell Radio Network Temporary Identifier (C-RNTI) of the first CC and at least one of a virtual cell identification (ID) and a virtual Cell Radio Network Temporary Identifier (C-RNTI) of the second CC. When the control information is decoded using a first scrambling sequence generated using the cell ID and C-RNTI of the first CC, the method includes using a resource allocated by the control information on the first CC. When the control information is decoded using a second scrambling sequence generated using the virtual cell ID and virtual C-RNTI of the second CC, the method includes using a resource allocated by the control information on the second CC.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects and novel features of the invention will become apparent from the following detailed description of the invention when considered in conjunction with the drawings.

The various aspects of the subject invention are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

In network implementations, carrier aggregation can be used to support wider transmission bandwidths and increase the potential peak data rate for communications between a UE, base station and/or other network components. In carrier aggregation, multiple component carriers are aggregated and may be allocated in a sub-frame.

Multi-carrier network implementations may be implemented using Type A or Type B carriers, or a combination thereof. Generally, because each Type A carrier is fully configured, a Type A carrier that is backward compatible may be accessible to Rel-8, 9, and 10 UEs. In contrast, a non-backward compatible Type A carrier may be accessible only to Rel-10 UEs. Each Type A carrier may be configured to operate as a standalone carrier for both single carrier UEs and multi-carrier UEs.

Generally, within any network, a cell is defined in accordance with Rel-8 specifications. Accordingly, from a base station perspective, each Type A carrier supported by the base station may be considered a cell. For example, a base station supporting multiple Type A carriers has multiple cells that correspond to each of the Type A carriers. Conversely, Type B carriers may not be defined as cells because those carriers are not standalone and are not fully accessible to a UE. As such, in the present system, while in an RRC_CONNECTED state, a UE must be assigned at least one Type A component carrier (CC) (i.e., a cell) and may be assigned zero or more Type B CCs. In the present disclosure, the term carrier and CC are equivalent and may be used interchangeably.

Anchor Carriers in Multi-Carrier Network Implementations

In some existing network implementations, one of the two cells or CCs assigned to the UE may be designated as a serving cell or anchor CC while the other cell or CC is designated as a secondary serving cell. For LTE-A carrier aggregation, because there are two types of carriers and only Type A CCs qualify as cells, one of the assigned Type A CCs may be designated as an anchor carrier or serving cell of the UE. The following discussion illustrates one potential implementation of an anchor carrier as deployed in a multi-carrier wireless communication system. The present system provides mechanisms for implementing encryption key derivation algorithms and methods, received signal measurements, time/frequency tracking, and monitoring of system information (SI) broadcasts using the anchor carrier of the present disclosure.

When communicating with the network using carrier aggregation, one or more of the communications transmitted via the CCs may be encrypted using security keys that are different for each CC. In the case of LTE-A carrier aggregation (CA), because a UE may be assigned multiple CCs on which signaling and data information is transmitted, the UE may need to be configured to define the input parameters to the security keys generation algorithms. The security keys are used for encryption and integrity protection of the signaling and data information. In the present system, the UE and the base station may be configured to generate security key $K_{eNB}$ based on the physical cell identify (PCI) and CC frequency of the anchor carrier assigned to the UE. When a new anchor CC (or target cell) is assigned to the UE (e.g., when the UE switches from one anchor CC to another), a new security key $K_{eNB}*$ is generated based on the existing $K_{eNB}$ and the physical cell identity (PCI) and carrier frequency of the new (or target) anchor CC. In that case, the hierarchical keys structure and derivation algorithms as defined in 3GPP TS 33.401, v9.0.0 can be used. The subsequent keys for user plane (UP) traffic encryption ($K_{UPenc}$), RRC traffic encryption ($K_{RRCenc}$) and RRC traffic integrity protection ($K_{RRCint}$) may then be derived from $K_{eNB}$ or $K_{eNB}^*$.

Alternatively, a UE may be assigned a particular CC by the serving base station via signaling (e.g., RRC signaling) for encryption and integrity protection key generation. For example, the UE may be assigned a security-anchor CC, upon which security key generation may be based. The UE may be assigned a security-anchor CC when the UE enters the RRC_CONNECTED state. The UE may then calculate the new $K_{eNB}$ based on the existing $K_{eNB}$ (e.g., the one derived from $K_{ASME}$ when the UE first enters an RRC_CONNECTED state) and the PCI and carrier frequency of the security-anchor CC. In some embodiments, the security anchor CC may be semi-statically configured but may be reconfigured by the base station, The serving base station may be configured to signal the UE to change the security-anchor CC during the RRC_CONNECTED state, during handover to a new base station (e.g., an eNB) and/or during anchor CC switching, for example. The security-anchor CC may be the current anchor CC of the UE or it may be another Type A CC within the UE's Active CC set. In one implementation, the security-anchor CC may be any one of the Type A CCs that serves the same geographical or coverage area of a cell or CC. As in the case of DC-HSPA, in LTE-A CA, multiple CCs may have the same coverage area if they belong to the same sector. Once assigned, the security-anchor CC may be fixed for the UE as long as the UE switches the UE's anchor CC amongst any Type A CCs that serve the same geographical area. In an alternative implementation, once assigned, the security-anchor CC may be fixed for the UE as long as the UE continues to be assigned an anchor CC from within the same base station. The same set of keys (e.g., $K_{UPenc}$, $K_{RRCenc}$, $K_{RRCint}$) generated based on the anchor CC or security-anchor CC may be used for UP traffic and RRC traffic transmitted on the different CCs assigned to the UE (because ciphering and integrity protection occur at the packet data convergence protocol (PDCP) sublayer, the UP traffic and RRC traffic should be unaware of the CCs that have been assigned to the UE).

When communicating with the network, the UE may be configured to monitor a received power and received quality for one or more of the CCs used by the UE. In the present system, it is not necessary for the UE to report Reference Signal Received Power (RSRP) measurements on each of the CCs because the RSRP (which represents the received signal strength) for CCs within the same band may generally be the same. As such, the anchor CC of a UE may be defined as the carrier upon which RSRP measurements are made at the UE and reported to the base station. Those measurements may represent the RSRP for all other CCs assigned to the UE in the same band.

In the case of Reference Signal Received Quality (RSRQ) measurements, because RSRQ represents the signal-to-interference ratio of a CC, different CCs may have different interference levels as a result of loading conditions, frequency reuse, etc. Therefore, in some cases, RSRQ may be reported by the UE on each of the assigned CCs. RSRQ may also be measured and reported on the anchor CC only and represent the RSRQ for all other CCs assigned to the UE in the same band, as in the case of RSRP described above. For CCs in different bands, the base station may instruct the UE to measure and report the RSRP, and possibly RSRQ, of one of the CCs within each band. Alternatively, only a single RSRQ report may be required for some or all of the CCs assigned to the UE. Also, the base station may configure the UE to measure and report the RSRQ on specific CCs. In another implementation, the base station may configure the UE to report the RSRQ of one of the assigned CCs in a band and report the delta interference levels of other assigned CCs within the same band with respect to the interference level of the carrier for which RSRQ is reported. As such, the base station may compute the effective RSRQ of other assigned CCs based on the RSRQ of the carrier for which RSRQ is reported plus the delta interference levels reported by the UE.

In the present multi-carrier system, a UE may be assigned multiple CCs. If the CCs are within the same band, there may not be a need to perform synchronization and time/frequency tracking on all the assigned CCs because the CCs are already synchronized amongst each other as they reside in the same band. As such, the anchor CC of a UE may be the CC upon which the UE performs synchronization and time/frequency tracking. Alternatively, depending upon the base station configuration (e.g., whether the same clock is applied to all the CCs), the base station may instruct the UE to perform synchronization and time/frequency tracking on other non-anchor Type A CCs. The other non-anchor CCs may be CCs in the same band or in different bands than the anchor CC.

In conventional network implementations, while in an RRC_CONNECTED state, a UE may monitor all the necessary system information (SI), i.e., Master Information Block (MIB), System Information Block Type 1 (SIB1) and System Information Block Type 2 (SIB2) on a single assigned CC. In the present system, however, the UE may not continuously monitor MIB, SIB1 and SIB2 on all the assigned CCs because some of the information may not change dynamically and some information is not relevant to the UE if the CC is not the anchor CC of the UE. As such, the UE may be configured to only monitor MIB, SIB1 and SIB2 on the anchor CC continuously. In that case, the base station may be configured to indicate to the UE when to monitor the SI on the other, non-anchor carriers. The UE may also be configured to monitor paging messages on the anchor carrier for Earthquake and Tsunami Warning System (ETWS) or Public Warning System (PWS) notifications and SI change indications, for example. The paging message sent on the anchor carrier may then be used to indicate whether the SI in the other CCs assigned to the UE will change at the next modification period boundary.

In the present system, a UE may be configured to monitor the PDCCH of one or more of the CCs assigned to the UE. Accordingly, from the physical layer perspective, one or more of the downlink (DL) CCs assigned to the UE can be designated as PDCCH monitoring CCs. A PDCCH monitoring CC may be defined as a DL CC where the UE monitors the PDCCH of the CC for PDSCH assignments on at least one of the CC, other DL non-PDCCH monitoring CCs, and/or other DL PDCCH monitoring CCs. A PDCCH monitoring CC may also be a DL CC where the UE monitors the PDCCH for PUSCH assignment on the UE's uplink (UL) CCs associated with the DL PDCCH monitoring CC.

In one implementation, a PDCCH monitoring CC is associated with a subset of the DL non-PDCCH monitoring CCs and/or a subset of DL PDCCH monitoring CCs where the PDSCH assignment on these CCs is sent on the PDCCH monitoring CC. In another implementation, a PDCCH monitoring CC is associated with a subset of the UL CCs where the PUSCH assignment on these CCs in sent on the PDCCH monitoring CC. The set of PDCCH monitoring CCs may be signaled by the base station to the UE using a media access control (MAC) control element or RRC signaling, for example. The association of other DL and UL CCs with each PDCCH monitoring CC may also be signaled by the base station to the UE through dedicated signaling such as MAC control element or RRC signaling. Alternatively, the PDCCH monitoring CCs and the association of other DL/UL CCs with each PDCCH monitoring CC are common to all UEs served by the same base station within the same geographical area. In that case, the signaling of such information may be sent through broadcast signaling, such as an SI broadcast.

Each DL or UL CC associated with a PDCCH monitoring CC may be assigned an index corresponding to the PDCCH monitoring CC. The index can be used in the explicit or implicit CC indication in the PDCCH sent on the PDCCH monitoring CC to uniquely identify the PDSCH/PUSCH assignment on a DL/UL CC associated with the PDCCH monitoring CC. Generally, an anchor CC will be one of the PDCCH monitoring CCs. On the other hand, a PDCCH monitoring CC may not be an anchor CC of the UE. A PDCCH monitoring CC is a Type A CC. In another implementation, however, a PDCCH monitoring CC can be a Type B CC if a Type B transmits a PDCCH. A non-anchor CC may or may not be a PDCCH monitoring CC.

Non-Anchor Carriers in Multi-Carrier Network Implementations

In a multi-carrier network implementation, CCs other than the anchor CC assigned to a UE may be referred to as non-anchor CCs. The non-anchor CCs that are assigned to the UE can be viewed in two different ways. First, the non-anchor CCs may be viewed as additional or supplemental resources accessible to the UE. Secondly, if the non-anchor CCs are Type A CCs, the non-anchor CCs may be viewed as secondary or supplemental serving cells accessible to the UE. If the non-anchor CCs are Type B CCs, the non-anchor CCs may be viewed as virtual secondary or supplemental serving cells of the UE. The following disclosure presents various implementations of non-anchor CCs that are applicable to non-anchor CCs whether of the first or second type.

In some conventional network implementations, cell specific scrambling, where the scrambling sequence used for traffic and/or control channels for each cell is related to the physical cell ID (PCI) of the cell, is implemented to provide the transmitted signal with more random characteristics improving the signal to noise ratio of the network. In the present system, cell specific scrambling of the traffic and/or control channel transmitted on an anchor CC may be implemented using the PCI of the anchor CC. However, for the non-anchor CC the scrambling sequence used for traffic and/or control channels transmission on the non-anchor CC may be based on the PCI of the anchor CC. In the case of a Type A non-anchor CC, the CC may have its own PCI and the scrambling sequence applied may be based on that PCI. In the case of a Type B non-anchor CC, the non-anchor CC may not transmit Synchronization Signals (Primary Synchronization Signal (PSS) and Secondary Synchronization Signal (SSS)) from which the PCI is derived and therefore a PCI may not exist in the Type B CC. Accordingly, a virtual PCI may be assigned to a Type B CC. The base station can signal the virtual PCI of a Type B CC to the UE via appropriate signaling (e.g., RRC signaling). In one embodiment, the RRC signaling sent from the base station to the UE to assign the virtual PCI is broadcast signaling such as system information broadcast. In another embodiment, the virtual PCI assignment can be sent from the base station to the UE using dedicated signaling as part the Type B CC assignment signaling.

In the present disclosure, when communicating using a non-anchor CC a UE may not fully implement one or more operations as would be done on an anchor CC to facilitate the operation of a multi-carrier communication network. For example, when allocated a resource on a non-anchor CC, the UE may not use the PCI and carrier frequency of a non-anchor CC to generate the security keys for UP and RRC traffic. Similarly, the UE may not perform synchronization and time/frequency tracking on a non-anchor CC. For example, the UE may only perform synchronization and time/frequency tracking on a non-anchor CC that is located at a separate frequency band than the anchor CC. In one implementation, where the Type B CC does not transmit synchronization signals, when the base station assigns a Type B non-anchor CC to a UE on a particular frequency band, the base station may also assign a Type A CC to the UE on the same frequency band. As such, the UE may use the assigned Type A CC for synchronization purposes. The non-anchor CC may be a Type A CC or a Type B CC.

When allocated one or more CCs, a UE may be configured to receive system information (SI) broadcasts via all CCs, or a subset of the CCs to discover certain configuration details for a particular CC. For example, the UE may need to know the physical channel configuration information of the CC to correctly receive and transmit on various physical channels such as the Physical Hybrid ARQ Indicator Channel (PHICH), Physical Downlink Control Channel (PDCCH), Physical Random Access Channel (PRACH), Physical Downlink Shared Channel (PDSCH), Physical Uplink Shared Channel (PUSCH), and Physical Uplink Control Channel (PUCCH). Also, it is possible for the configuration information to be changed or reconfigured by the base station, for example to adapt to changes in the cell loading. As such, it can be important for the UE to monitor and be aware of any changes made to the SI on the CCs allocated to the UE.

The SI messages may include a MIB plus a number of System Information Blocks (SIBs). The MIB may contain the PHICH configuration information that allows the UE to decode additional information received via the carrier. The majority of the physical channel configuration information is contained in SIB2 messages.

Generally, a base station may only make changes to the content of a carrier's SI at the boundary of a specific time duration called a modification period. If there is a change in the content of the SI, the base station sends paging messages that contain a 'system information change indicator' during the modification period prior to the modification period at which the change will occur. At the boundary between the two modification periods, the base station may increment a 'value tag' that is contained in a SIB1 message. A UE that is in idle mode monitors the paging channel and, if a paging message containing the 'system information change indicator' is received, then the UE re-reads the SI after the next modification period boundary to acquire the changes to the content.

The paging channel can be transmitted at specific periodically occurring paging occasions where the location of the paging occasions (i.e. the frame numbers and subframe where the paging occurs) are determined by parameters that are contained in SIB2. An idle mode UE may only monitor one paging occasion every paging cycle. A UE that is in connected mode can either monitor the paging channel periodically for paging messages containing the 'system information change indicator', or the UE can re-read the 'value tag' from the SIB1 message after each modification period boundary to detect a change in the content of system information. Upon detecting any changes, the UE may re-read the SI to acquire the changes. In addition, some SI content, in particular the physical channel configuration information from an SIB2 message, can also be included in dedicated RRC messages (i.e. RRC messages that are sent to or from a specific UE) that command the UE to perform a handover to another cell or CC, thus allowing the UE to start communicating with that CC without any delay associated with reading the SI.

In the present system, for carrier aggregation, the UE may use existing mechanisms to obtain the necessary system or configuration information describing the anchor CC. However, to obtain SI describing the non-anchor CCs new mechanisms are needed. In the present system alternative mechanisms are presented depending upon whether the non-anchor CC is a Type A CC or a Type B CC.

If the non-anchor CC is a Type A CC then the non-anchor CC may broadcast SI. Some SI that may be broadcast from the non-anchor CC may not be relevant to the UE and can be ignored—the information may be relevant to UEs for which this CC is the UE's anchor CC or for UEs that are camped in idle mode on the CC. An example of such information is the Tracking Area Identity (TAI) or Cell Global Identity (CGI). Such an implementation would not place any requirements on the network to coordinate or align this information between the component CCs; it would still be possible for the network to use different TAIs and CGIs on the different component CCs.

In the present system, the PHICH configuration information of the non-anchor CCs needs to be conveyed to a UE who has been assigned those carriers. In one implementation, the UE may decode the MIB on the non-anchor CC periodically on the subframe where the MIB is transmitted. Alternatively, the PHICH configuration of a non-anchor CC can be sent to the UE using dedicated signaling (e.g., RRC signaling). The PHICH configuration information may only need to be sent to the UE when the configuration has changed or is about to change. In one implementation, the base station sends dedicated RRC signaling or MAC control element to the UE to convey the updated PHICH configuration information of a non-anchor CC assigned to the UE. In one implementation, the dedicated RRC signaling or MAC control element is sent on any of the active CCs assigned to the UE. In another implementation, the dedicated RRC signaling or MAC control element is sent on any of the active CCs assigned to the UE, except the non-anchor CC for which the PHICH configuration information is targeted. In another implementation, the base station sends multicast signaling, such as MAC signaling or RRC signaling, on a Type A CC to convey the updated PHICH configuration information to a group of UEs whose anchor CC is this Type A CC and who have been assigned the non-anchor CC. A group Radio Network Temporary Identifier (RNTI) may be used to address the group of UEs that have been assigned to a non-anchor CC and this group RNTI may be provided to the UE using the RRC signaling used to assign that component carrier to the UE. The group RNTI may then be used for cyclic redundancy check (CRC) masking of the PDCCH and scrambling of the PDSCH used to carry the multicast RRC or MAC signaling. In another implementation, the base station sends broadcast RRC signaling (e.g., SI) on a Type A CC to convey the updated PHICH configuration information of a subset or all other Type A and Type B CCs serving the same geographical area. In another implementation, the base station sends broadcast RRC signaling, such as SI, on a Type A CC to convey the updated PHICH configuration information of other Type A and Type B CCs that could be associated with the Type A CC.

SIB2 Information Acquisition by a UE

As described above, other than the PHICH configuration information, a majority of the physical channel configuration information is contained in System Information Block 2 (SIB2) messages.

If a non-anchor CC is not a PDCCH monitoring CC, the UE can be notified of the changes in the content of SIB2 for the non-anchor carrier through the paging messages sent on the anchor CC from the base station. If the paging message indicates that there are some changes at the next modification period boundary, the UE may read the SIB1 transmitted by the non-anchor CC after the next modification period boundary to obtain SI scheduling information. The UE may then enable PDCCH monitoring on the non-anchor CC at the subframe where SIB2 information is expected to be broadcast on the non-anchor CC.

By including indications of changes of the SIB2 content of non-anchor CCs in the paging messages sent on the anchor CC, the UE can avoid monitoring paging messages on more than one CC. In one implementation, at the subframes upon which the UE enabled PDCCH monitoring to receive SIB1 or SIB2 messages on the non-anchor CC, the UE may not monitor the PDCCH on the anchor CC or one or more of other PDCCH monitoring CCs.

If the UE does not monitor the PDCCH on the anchor CC or one or more of other PDCCH monitoring CCs then there may be some data loss on those CCs and other CCs associated with those CCs. That loss, however, may be acceptable if the frequency of the change of SIB2 content is relatively low.

The number of carriers upon which the UE can simultaneously decode the PDCCH may be signaled by the UE to the base station (e.g., using RRC signaling). The base station may then refrain from sending PDCCH to the UE on the anchor CC and/or one or more PDCCH monitoring CCs at the subframes where the UE monitors the PDCCH on the non-anchor CC which is not a PDCCH monitoring CC. For example, the base station may signal to the UE the PDCCH monitoring CCs that will not be in effect while the UE is decoding SIB2 information of a non-anchor CC which is not a PDCCH monitoring CC. Alternatively, the PDCCH monitoring CCs of an UE that are not in effect may be predefined, for example, as a number of PDCCH monitoring CCs starting with the smallest/largest carrier index. In some cases, the UE may be configured to inform the base station when the SIB2 information acquisition on a non-anchor CC has been completed.

Table 1 is an illustration of a paging message structure that includes a system information change indication field for each CC to facilitate receipt of SI messages from a UE via an anchor carrier and one or more non-anchor carriers. The changes with respect to the paging message of Rel-8 and Rel-9 are underlined.

TABLE 1

```
-- ASN1START
Paging ::=                  SEQUENCE {
    pagingRecordList            PagingRecordList                    OPTIONAL,    --
Need ON
    systemInfoModification      ENUMERATED {true}                   OPTIONAL,    --
Need ON
    etws-Indication             ENUMERATED {true}                   OPTIONAL,    --
Need ON
    nonCriticalExtension        SEQUENCE {
        carrierSystemInfoModificationList    CarrierSystemInfoModificationList    OPTIONAL,
        nonCriticalExtension                 SEQUENCE { }                         OPTIONAL    --
Need OP
    }                           OPTIONAL    -- Need OP
}
PagingRecordList ::=        SEQUENCE (SIZE (1..maxPageRec)) OF PagingRecord
PagingRecord ::=            SEQUENCE {
    ue-Identity                 PagingUE-Identity,
    cn-Domain                   ENUMERATED    {ps, cs},
    ...
}
PagingUE-Identity ::=       CHOICE {
    s-TMSI                      S-TMSI,
    imsi                        IMSI,
    ...
}
IMSI ::=                    SEQUENCE (SIZE (6..21)) OF IMSI-Digit
IMSI-Digit::=               INTEGER (0..9)
CarrierSystemInfoModificationList     ::=SEQUENCE    (SIZE    (1..maxSIModRec))    OF
CarrierSystemInfoModification
CarrierSystemInfoModification :: =    SEQUENCE {
    carrier-Index               Physical-Carrier-Index,
    modification                ENUMERATED (true)
}
-- ASN1STOP
```

With reference to Table 1, the following paging field descriptions may be used. Carrier index is an Index to the carrier to which the CarrierSystemInfoModification applies. ModificationMIB is a true or false value that indicates whether the system information in MIB on the carrier will be changed at the next modification period boundary. ModificationSIB2 refers to a true or false value that indicates whether the system information in SIB2 on the carrier will be changed at the next modification period boundary.

With reference to Table 1, in one implementation of the paging message, the CarrierSystemInfoModification fields for other CCs may be included in all of the paging occasions. Alternatively, the CarrierSystemInfoModification fields for other CCs are included in only some of the paging occasions. By including the extra CarrierSystemInfoModification fields in only a subset of paging occasions there may be a reduction in the overhead contained in each paging message, both in size and processing requirements. In that case, however, the UE may need additional information describing the paging occasions that will contain the CarrierSystemInfoModification fields. Those paging occasions may be fixed or be configurable by the base station. If configurable, the base station may inform the UE of the paging occasions that will include the CarrierSystemInfoModification fields for other CCs. In one implementation, different CarrierSystemInfoModification fields for different sets of CCs may be sent on different paging occasions.

In another implementation, the UE may be configured to decode the paging message on a non-anchor CC to read the system information change indication for a non-anchor CC. In that case, any paging occasions on the non-anchor CC that include SI change indications may be defined by the base station and communicated to the UE (e.g., using RRC signaling). The base station may inform the UE of the radio frames and subframes in which the paging occasions will take place. One specific implementation of an RRC message configured to communicate such information is shown in Table 2 below (see, specifically, the variables siPaging-Config1 and siPaging-Config2 illustrated in the example RRC message for communicating the paging configuration for a particular non-anchor CC).

Alternatively, paging occasions on non-anchor carriers can be obtained in the same manner as that defined for Idle mode in Rel-8 (see Section 7 of TS36.304) but applied to a UE in RRC_CONNECTED mode. At those paging occasions, the UE enables PDCCH monitoring on the non-anchor carrier for the common PDCCH search space. The UE decodes the common PDCCH search space on the non-anchor carrier for Paging RNTI (P-RNTI) and if the UE succeeds in decoding the PDCCH with the P-RNTI, the UE subsequently decodes any paging message sent on the non-anchor carrier. The benefit of this approach is there is no need to include SI change indications or paging occasions configuration for other CCs in a Type A CC. This allows SI to be independently managed across CCs. The paging occasions that include the SI change indication on the non-anchor CC may occur periodically with a period that is a multiple of the paging occasions on the anchor CC, with the multiple being communicated to the UE via RRC signaling as shown in Table 2. In addition, the paging occasions that include SI change indications on the non-anchor CC may occur during the same subframes as those of the anchor CC. Alternatively, the paging occasions for the non-anchor CC may be a function of the paging occasions for the anchor CC (e.g. at a similar frequency and period, or a multiple of that of the anchor CC's paging cycle, but with a configured or predefined radio frame/subframe offset).

If the non-anchor CC is a PDCCH monitoring carrier, the UE may decode paging messages on the anchor CC to receive SI change indications for other non-anchor CCs, as described above. In this implementation, however, although the UE can decode the common PDCCH search space on the non-anchor CC for System Information Radio Network Temporary Identifiers (SI-RNTI) and the subsequent SIB2 information, by monitoring the SI change indication sent in the paging message of the anchor CC, the UE does not need to do blind detection of SI-RNTIs on the non-anchor CC. The UE also does not need to decode the SIB2 on the non-anchor CC if the paging message sent on the anchor CC does not indicate a change in the SI of the non-anchor CC. In this manner, the UE's battery power can be saved by reducing the blind decoding amount.

Alternatively, if the non-anchor CC is a PDCCH monitoring carrier, the UE may decode paging messages on the non-anchor CC to receive SI change indications for the non-anchor CC, as described above. The paging occasions on the non-anchor CC that include the SI change indications can be defined by the base station and communicated to the UE via signaling such as RRC signaling. In the RRC signaling message, the radio frames and subframes for the paging occasions may be included. One specific implementation of such an RRC message is shown in Table 2 (see, specifically, the variables siPaging-Config1 and siPaging-Config2 illustrated in the example RRC message for communicating the paging configuration for a particular non-anchor CC). At those paging occasions, the UE can decode the common PDCCH search space on the non-anchor carrier for Paging RNTI (P-RNTI) and if the UE succeeds in decoding the PDCCH, subsequently decode the paging message sent on the non-anchor CC. The benefit of this approach is that there is no need to include SI change indications for other CCs in a Type A CC. As such, SI may be independently managed across CCs. The paging occasions for SI change indications on the non-anchor CC may occur periodically, with the period being defined as multiples of the period for paging occasions on the anchor CC. In addition, the paging occasions that include SI change indications on the non-anchor CC may occur in the same subframe as that of the anchor CC. Alternatively, the paging occasions for the non-anchor CC may be a function of the paging occasions for the anchor CC (e.g. similar frequency and period, or a multiple of the anchor CC's paging cycle, but with a configured or predefined subframe offset).

Type B Carriers

In the present system a Type B CC can only operate as a non-anchor CC of a UE—a Type B CC does not transmit all the system information that would be transmitted by a Type A CC. For example a Type B CC may not transmit information such as DL bandwidth, cell related information, or UL carrier frequency. A Type B CC may or may not transmit synchronization signals (which allow for the derivation of PCI).

If the Type B CC does transmit a PDCCH, the CC may also be configured to broadcast configuration information such as radio resource configuration information, and PHICH configuration information. A new SIB type may be defined for a Type B carrier to carry the radio resource configuration information and the PHICH configuration information for a non-anchor CC. The information in the new SIB may be a subset of that provided by a SIB2 message plus the PHICH configuration.

In one implementation, the Type B CC only transmits the new SIB when there is an update to the information. In some cases, any updates of the information in the new SIB cannot occur more frequently than every modification period. The Type B CC may only transmit the new SIB at predefined periods or subframes/radio frames. Whether the transmission is event-triggered or predefined, the scheduling information of the new SIB on the Type B CC can be predefined or can be signaled to the UE via the UE's anchor CC. The signaling of the scheduling information can be performed using RRC signaling messages that include the radio frames and subframes during which the new SIB may be transmitted on the Type B CC. One specific implementation of such an RRC message is shown in Table 2. For these implementations, similar approaches to signal to the UE the SI change indication (in this case corresponding to the new SIB) and for the UE to acquire the SI, i.e. the new SIB, on the non-anchor Type B CC as described above can be implemented.

In the case where the Type B CC does not transmit DL control information, including a PDCCH, PCFICH and PHICH, the UE may not be informed of the PHICH configuration of the non-anchor CC. In that case, a new SIB type may be defined for Type B CCs that carries only radio resource configuration information. In that case, a Type A CC transmits a PDCCH with SI-RNTI to point to the PDSCH of the Type B CC that carries the new SIB. The UE may then monitor the UE's anchor Type A CC for the PDCCH that points to the PDSCH of any of the other Type B CCs that serve the same geographical area. Alternatively, the UE may monitor any of the assigned Type A PDCCH monitoring carrier for the PDCCH that points to the PDSCH of other Type B CCs that serve the same geographical area. A Type A CC may only transmits a PDCCH to point to the PDSCH of the Type A CC's associated Type B CCs. The Type A CC may be configured to only transmit the PDCCH to point to the PDSCH of a Type B CC that carries the new SIB whenever there is an updated new SIB sent on the Type B CC. A CC indication field may be added to the existing DCI format 1C to indicate the Type B CC to which the PDSCH assignment corresponds. In another implementation, a new DCI format which includes a CC indication field is introduced to carry the PDSCH assignment information for a Type B CC.

Alternatively, the Type B CC does not transmit any SI related to radio resource configuration or PHICH configuration. In that case, the UE may be configured to acquire the SI of a non-anchor Type B CC via its anchor CC—a Type A CC. In one implementation, a Type A CC broadcasts the SI of all other Type B CCs that serve the same geographical area. This extra information on the Type A CC could be encoded within a new SIB message or could be appended to the existing SIB2 message. In another implementation, a Type A CC only broadcasts the SI of the Type B CCs that are associated with the Type A CC.

In yet another implementation, the Type B CC transmits DL control information including a PDCCH, Physical Control Format Indicator Channel (PCFICH) and PHICH, but the Type B CC does not transmit PHICH configuration information and only transmits the SI related to radio resource configuration. The PHICH configuration and PCFICH information of a Type B CC (e.g., the number of orthogonal frequency-division multiplexing (OFDM) symbols for PDCCH) may be fixed or preconfigured to the UE via signaling on the anchor CC or other assigned Type A CCs. If the PHICH configuration and/or PCFICH information is not fixed, the UE may acquire the information related to PHICH configuration and PCFICH of its non-anchor Type B CC on the UE's anchor CC or other assigned Type A CCs. In one implementation, a Type A CC broadcasts the PHICH configuration and PCFICH information of all other Type B CCs that serve the same geographical area. In another implementation, a Type A CC only broadcasts the PHICH configuration and PCFICH information of those Type B CCs that are associated with the Type A CC. A new SIB type is introduced for the Type A CC to carry the PHICH configuration information and PCFICH information of one or more Type B CC. Alternatively, the PHICH configuration information and PCFICH information of one or more Type B CC is appended to the existing SIB (e.g. SIB2) of a Type A CC.

Component Carrier Sets

When a UE initially enters an RRC_CONNECTED state, the UE is generally assigned a single Type A CC. The CC upon which the UE performs initial access may be the first assigned CC of the UE to carry UP traffic and RRC traffic. By default, the CC becomes the anchor CC of the UE. The base station may re-assign other Type A CCs to the UE as the anchor CC after the UE enters the RRC_CONNECTED state. Additional CCs may then be assigned to the UE by the base station. The set of CCs assigned to the UE can be classified into the Candidate CC Set and the Active CC Set.

In the present system, when assigning a CC to a UE, the base station may also instruct the UE to enable signal reception on the CC. When a CC is assigned to the UE without requiring the UE to enable signal reception on the CC, the CC becomes part of the UE's Candidate CC Set but not part of the Active CC Set. When a CC is assigned to the UE, and the UE is required to enable signal reception on the CC, the CC becomes part of the UE's Candidate CC Set and Active CC Set. A UE's Active CC set is therefore a subset of the UE's Candidate CC Set.

In the case of DRX, during the Active time of a CC, the CC is part of the UE's Active CC set. When not in Active time of a CC, the CC is part of the UE's Candidate CC set. When transitioning between Active time and non Active time is through configured DRX timers and cycles, no explicit signaling is required to activate/de-activate the CC.

Figure 4:
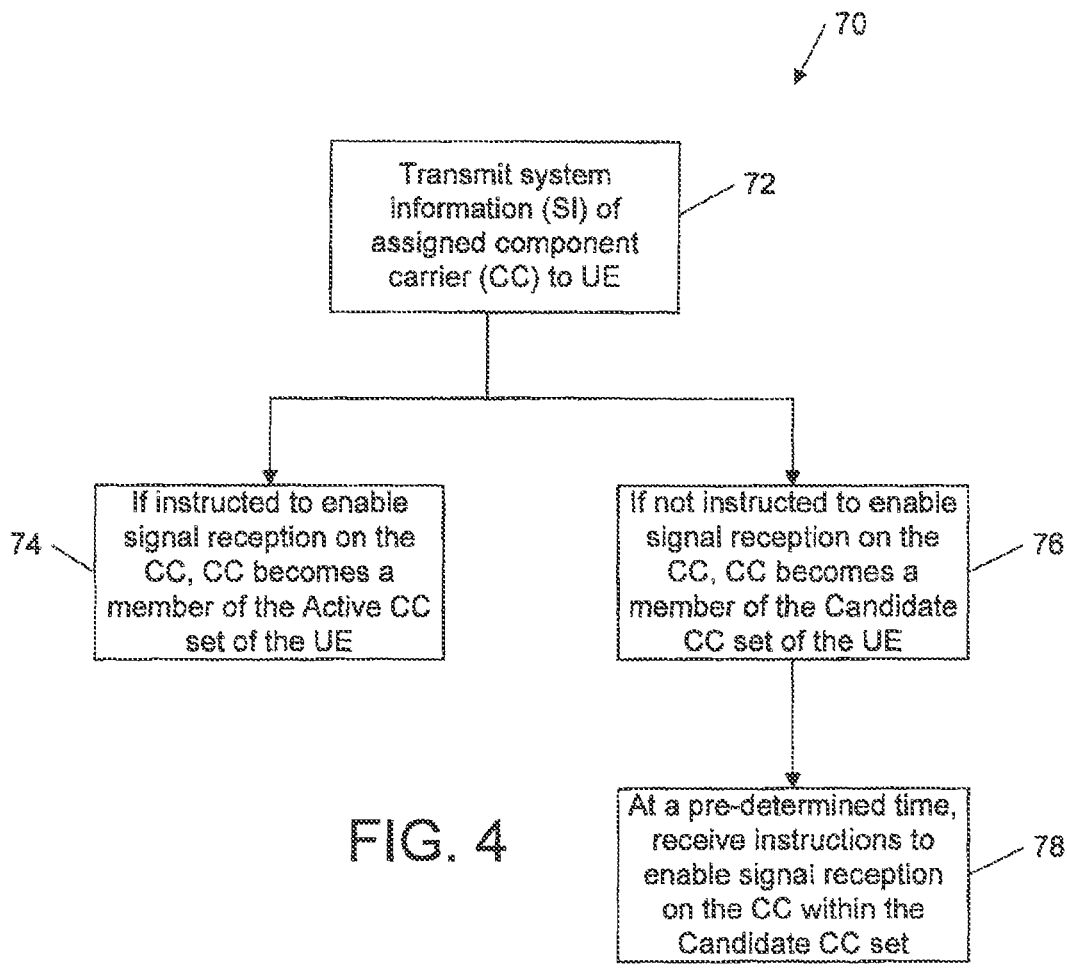
FIG. 4 is a flowchart illustrating a process for a user equipment (UE) to retrieve up-to-date system information (SI) for a component carrier (CC) recently assigned to a UE.

For the CCs within the Active CC set of the UE, the UE needs to know the up-to-date system information (e.g., MIB, SIB1, SIB2) associated with each CC. FIG. 4 is a flowchart illustrating process 70 for a UE to retrieve up-to-date SI for a CC recently assigned to a UE. The process allows for simple and low-overhead activation of a CC into the UE's Active CC set.

In step 72, when a CC is assigned to the UE by the base station, the necessary SI of the CC is provided to the UE via RRC signaling, if such information is not already broadcast by the base station.

In one implementation of the present system, in the first step 72, when a CC is first assigned to the UE, detailed information of the CC is also signaled to the UE via dedicated signaling carried on one or multiple CCs in the Active CC set of the UE. The information types may include at least one of 1) SIB1 related information such as PCI, CGI (for Type A carrier only), or Closed Subscriber Group (CSG) related information; 2) DL CC frequency and paired UL CC frequency and corresponding bandwidths; 3) SIB2 related information for radio resource configuration which can change dynamically; 4) an indication of whether the CC is a Type A or Type B CC; 5) an indication of whether the CC is a PDCCH monitoring CC; 6) if the CC is a Type B CC, scheduling information for the SI of the CC; 7) a listing of paging occasions on the CC that includes the SI change indication; 8) a physical CC index and the mapped logical CC index of this CC; 9) if the CC is a Type B CC, the virtual PCI of the CC; and 10) Cell Radio Network Temporary Identifier (C-RNTI) for the UE on this CC, if applicable. For SIB1 and SIB2 information, only information deltas from those of the anchor CC may be signaled to the UE. A physical CC index may be defined by the numbering of the CCs supported by the base station from the base station perspective. For example, the numbering may correspond to the CCs supported by the base station sorted in increasing order of the CC frequency. The logical CC index is defined from the UE perspective and may be the index of the CC assigned to the UE. The logical CC index of an assigned CC may be used in subsequent signaling between the base station and the UE. For example, the logical CC index may be used in PDCCH grants for PDSCH/PUSCH assignment on the CC or CC indication in MAC control element for activation/de-activation of the CC.

In step 74, if the base station instructed the UE to enable signal reception on the CC in step 72, the CC becomes a member of the Active CC set of the UE. In that case, the UE acquires the up-to-date SI for the CC on an on-going basis as described above.

In step 76, if the base station did not instruct the UE to enable signal reception on the CC, the CC becomes a member of the Candidate CC set rather than a member of the Active CC set for the UE. In that case, the UE stores the SI of CC provided by the base station in step 72. The UE does not need to acquire the SI of the CC on an on-going basis.

In step 78, at a pre-determined time, the base station instructs the UE to enable signal reception on a CC within the Candidate CC set. If the SI of the CC has not changed from what is provided in step 72, the base station may send a short signaling message (e.g. MAC control element or PDCCH) to activate the CC. On the other hand, if the SI of the CC has changed from that provided in step 72, there are two alternative approaches. The base station may send RRC signaling to activate the CC and at the same time provide the up-to-date SI in the RRC signaling message. Alternatively, the base station may send a short signaling message (e.g. MAC control element or PDCCH) to activate the CC. After receiving the message, the UE acquires the up-to-date SI on the CC independently.

As shown in Table 2 (FIG. 12) an example RRC signaling to assign or de-assign a CC to or from a UE using dedicated signaling. In the case of CC assignment, the RRC signaling includes the associated CC information described above. The changes with respect to the RadioResourceConfigDedicated Information Element (IE) of Rel-8 and Rel-9 are underlined.

In another implementation of step 72 described above and shown in FIG. 4, a Type A CC broadcasts some or all of the information types 1) to 9) described above for all other Type A and Type B CCs that serve the same geographical area. A Type A CC may only broadcast some or all of the information types 1) to 9) of other Type A and Type B CCs associated with the Type A CC. SI of a CC that is not broadcast can be signaled to the UE when the base station instructs the UE to enable signal reception on the CC (e.g., via RRC signaling, MAC control element or PDCCH). In one implementation, more static and common types of information such as information types 1), 2), 4), 7), 8)-physical CC index only, and 9) can be broadcast while other information can be sent via dedicated signaling to the UE when the base station instructs the UE to enable signal reception on the CC. New SIB types are introduced for a Type A CC to carry this information. These new SIB types can be transmitted as part of the SI message. The scheduling information of these new SIB types can be sent in a SIB1 message.

As shown in Table 3 (FIG. 13) an example RRC signaling to carry CC information in a new SIB type, i.e., SIB12 shown in this example, according to the above description. SIB1 messages may already signal the scheduling of currently defined SIB types. In order for SIB1 to indicate the scheduling of a new SIB type it may be necessary to redefine a spare value of the information element (IE) SIB-Type to represent the newly introduced SIB, i.e. SIB12 shown in this example. The changes with respect to existing RRC signaling in Rel-8 and Rel-9 are underlined.

The base station may instruct a UE to measure the RSRP/RSRQ of a CC that may be in the UE's Active CC Set or a CC that is not in the UE's Active CC Set, but is in the UE's Candidate CC Set. The base station may also instruct a UE to measure the RSRP/RSRQ of a CC that is not in the UE's Candidate CC Set. One of the reasons that the base station may instruct a UE to measure and report RSRP/RSRQ on a CC that is not in the UE's Active CC set is to measure the received signal and interference level of the CC at the UE to assist the base station to decide whether to assign the CC to the UE's Active CC set.

Activation of a Carrier Within the Candidate Carrier Set

In the present system, the base station may signal the UE to activate or enable signal reception on a CC within the Candidate CC Set for the UE. The signaling can be sent on the anchor CC or one of the CCs within the UE's Active Carrier Set. If the SI (e.g., SIB2 information and/or other information) for the CC has not changed from what has previously been provided to the UE, the base station may activate the CC using a MAC control element. If the signaling is sent using a MAC control element, it can be sent on the anchor CC or one of the CCs within the Active Carrier Set. If the signaling is sent on the PDCCH, the signaling may be sent on one of PDCCH monitoring carriers within the Active Carrier Set. The logical carrier index of the CC, and possibly an Action Time, are included in the MAC control element or PDCCH. The Action Time defines a radio frame and subframe where the UE should enable signal reception on the CC indexed by the logical carrier index. In the case of DRX operation, if DRX parameters are configured for a CC within the Candidate CC Set, the UE may enable signal reception on the CC during the Active time of the DRX cycle.

If, however, the SI information has changed from what has previously been provided to the UE, the base station may use RRC signaling to activate the CC. The RRC signaling may include the physical or logical carrier index of the CC, the Action Time when the UE should enable signal reception on the CC, the updated or delta SIB2 information of the CC with respect to those of the anchor CC, and other updated information of the CC. Alternatively, MAC control elements or the PDDCH can be used to activate a CC. In that case, the MAC control element or the PDCCH includes a field to indicate to the UE whether there is updated SIB2 information on the CC. If there is updated SIB2 information, if the CC is a Type A carrier, the UE decodes the updated SIB2 information on the CC itself. The UE may decode the SIB2 information on the CC prior to the Action Time. For example, the UE may enable signal reception on the CC to decode SIB1 to read the scheduling information of SIB2 and subsequently decode SIB2 at the appropriate subframes. In another implementation, the UE only decodes the SIB2 information on the CC after the Action Time. In that case, there may be a delay associated with when the base station can schedule PDSCH and PUSCH transmissions for the UE on the CC. The UE may inform the base station via signaling such as RRC signaling after it has successfully decoded the SIB2 information.

If the CC is a Type B CC, the CC may or may not transmit SIB2 information as described above. If the Type B CC transmits SIB2 information, a MAC control element or PDCCH may be used to activate the CC as described above. If, however, the Type B CC does not transmit SIB2 information, the base station may use RRC signaling to activate the CC, with the RRC signaling including the updated or delta SIB2 information of the CC.

In the case of DRX operation, while not in Active Time, the UE may acquire the updated SIB2 information prior to the start of the next Active Time. For example, the UE may enable signal reception on the CC prior to the next Active Time to decode SIB1 messages to read the system InfoValueTag and scheduling information of the SIB2 and subsequently decode the SIB2 at the appropriate subframes. Alternatively, the UE may monitor the paging occasions on the anchor CC or the CC itself to determine whether there is an update to the SI at the next modification period boundary.

Switching of Anchor Carrier

The base station may be configured to signal a UE to switch the UE's anchor CC to an alternate Type A CC. In the present system, if the target anchor CC is a CC within the UE's Active CC Set, the base station transmits an RRC signaling message or MAC control element to the UE that includes the logical carrier index of the target anchor CC and/or possibly the Action Time of when the switch should occur. RRC signaling and MAC control elements may be configured to include an indication that the CC is the anchor CC of the UE at the specified action time.

As shown in Table 4 (FIG. 14), an example RRC signaling to activate or de-activate a component CC and designate a component CC as the anchor CC as described above. The changes with respect to the RadioResourceConfigDedicated IE in Rel-8 and Rel-9 are underlined.

Figure 10:
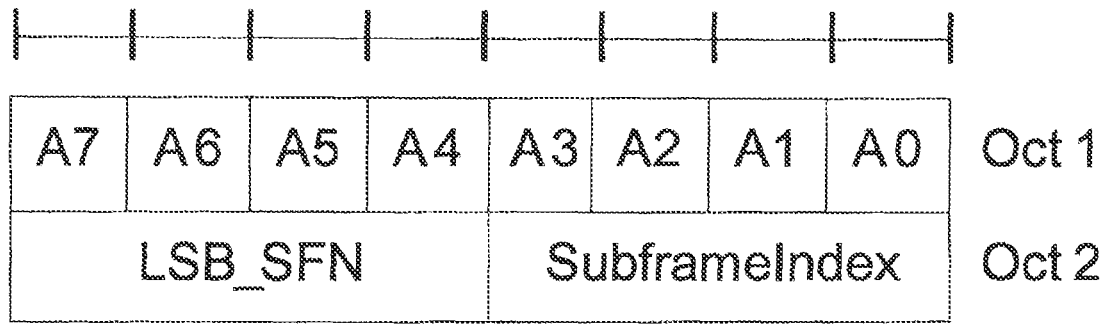
FIGS. 10 and 11 are illustrations of example Component Carrier Control MAC control elements.

As shown in Table 5 (FIG. 15), an example of signaling via a MAC Control Element (MAC CE) to activate or de-activate a CC for a particular UE. In the example shown in Table 5, up to 8 CCs can be activated/de-activated using the same MAC CE. The changes with respect to Rel-8 and Rel-9 are underlined. FIG. 10 is an illustration of an example Component Carrier Control MAC control element.

Figure 11:
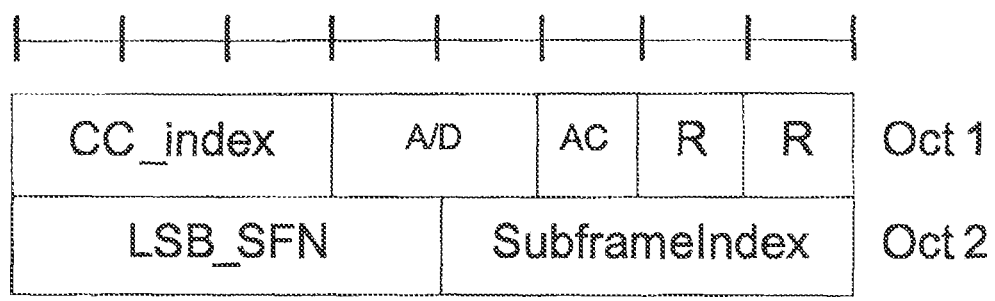

Table 6 shows another example of MAC CE to activate, de-activate or de-allocate a CC and designate it as the target anchor CC in the case of activation. The changes with respect to Rel-8 and Rel-9 are underlined. FIG. 11 is an illustration of the example Component Carrier Control MAC control element.

TABLE 6

6.1.3.x Component Carrier Control MAC Control Element

The Component Carrier Control MAC control element (see FIG. 11) is identified by MAC PDU subheader with LCID as specified in table 6.2.1-2.
It has a fixed size and consists of fields defined as follows (FIG. 6.1.3.x-1):
CC_index: logical or physical component carrier index.
A/D: Set to '00' to indicate the component carrier is de-allocated from the UE, i.e., the component carrier is no longer in the UE's Candidate Component Carrier Set or Active Component Carrier set; set to '01' to indicate the component carrier is de-activated, i.e. the UE shall disable signal reception on the carrier but the carrier remains in the UE's Candidate Component Carrier Set; set to '10' to indicate the component carrier is activated, i.e. the UE shall enable signal reception on the carrier and the carrier is in UE's Active Component Carrier Set; '11' is a reserved value.
AC: If A/D is set to '10', this bit is set to '1' to indicate the component carrier is the target anchor carrier.
Set to '0' otherwise.

TABLE 6-continued 6.1.3.x Component Carrier Control MAC Control Element

LSB_SFN: Four LSB of the SFN for next radio frame on which the UE should enable signal reception on the component carriers indicated in A0 to A7.
SubframeIndex: The index of the subframe within the radio frame on which the UE should take the action indicated by A/D on the component carrier indicated by CC_index.
R: Reserved bits set to 0.

If the target anchor CC is within the Active CC Set of the UE, the base station may use the PDCCH to instruct the UE to switch its anchor CC to the target anchor CC. The PDCCH can be sent on the current anchor CC or the target anchor CC for the UE if the target anchor CC is a PDCCH monitoring carrier. Alternatively, the PDCCH can be sent using any of the PDCCH monitoring CCs within the Active CC Set.

The security keys for the UE on the target anchor CC may be derived based on an existing CC or cell's $K_{eNB}$ and the target anchor CC/cell PCI and carrier frequency of the target anchor CC, as described above. In that case, the RLC sublayer and PDCP sublayer re-establishment may be performed after the UE switches to the new anchor CC at the Action time. Random access procedures on the associated uplink CC, which are normally performed for regular inter-cell handover, may be omitted. Random access procedures may be required, however, if the UL CC associated with the new anchor CC is on a different band than currently assigned UL CCs. As such, there may be some service interruption due to RLC and PDCP re-establishment. Alternatively, the security keys for the UE do not change when a UE switches from one anchor CC to another anchor CC. In that case, the RLC sublayer and PDCP sublayer re-establishment may be omitted after the UE switches to the new anchor CC. Also, random access procedures on the associated uplink CC, which are normally performed for regular inter-cell handover, may be omitted.

In one implementation, the security keys for the UE are derived based on existing CC/cell's $K_{eNB}$ and the target anchor CC/cell PCI and carrier frequency of the target anchor CC, as described above. The RLC sublayer and PDCP sublayer re-establishment may be omitted after the UE switches to the new anchor CC. The base station may indicate the starting PDCP sequence number (SN) for each configured radio bearer where the new security keys for the target anchor CC will take effect to the UE via signaling such as RRC signaling or a MAC control element. In that case, after the UE re-assembles the RLC SDU or PDCP PDU, if the PDCP sequence number is less than the starting PDCP sequence number indicated by the base station, the PDCP PDU will correspond to the old security keys used for the previous anchor CC. If the PDCP sequence number is equal or larger than the starting PDCP sequence number indicated by the base station, the PDCP PDU will correspond to the new security keys for the new anchor CC. Alternatively, the new security keys for the target anchor CC will apply on the first new PDCP packet for each configured radio bearer after the UE switches to the target anchor CC. PDCP packets generated on the source anchor CC and still undergoing RLC transmissions or retransmissions may continue to use the security keys corresponding to the source anchor CC. In that case, after the UE re-assembles the RLC SDU, if any of the RLC segments or PDUs of that SDU are received prior to the Action Time, that RLC SDU or PDCP PDU will correspond to the old security keys. Otherwise, the RLC SDU or PDCP PDU will correspond to the new security keys. Random access procedures on the associated uplink CC, which are normally performed for regular inter-cell handover, may be omitted.

PDSCH/PUSCH/PDCCH Scrambling

In existing network implementations, the PDSCH/PUSCH, and PDCCH of an assigned carrier to the UE may be scrambled using a combination of the RNTI and cell ID for the carrier. Existing scrambling techniques are described in section 6.3.1 (PDSCH), 5.3.1 (PUSCH), and 6.8.2 (PDCCH) of 3GPP TS 36.211, v 8.7.0, 3rd Generation Partnership Project; Technical Specification Group Radio Access Network; Evolved Universal Terrestrial Radio Access (E-UTRA); Physical Channels and Modulation (Release 8), June 2009. In multi-carrier network implementations, however, in which one or more CCs (e.g., Type B CCs) may not be defined as cells making it difficult to identify appropriate RNTI and cell ID values, it may be difficult to implement scrambling of one or more channels of a particular CC.

In the present system, to implement channel scrambling in Type A CCs, different C-RNTI values may be allocated to each Type A CC assigned to the UE as a candidate CC by the base station. In that case, the base station scrambles the control and traffic channels using the cell ID and C-RNTI values that correspond to the CC containing the control or traffic channel. This implementation allows for the assignment of independent C-RNTI values to a UE for each of the type A CCs accessible to the UE. In the case of a Type A CC that is not a PDCCH-monitoring carrier for the UE, the C-RNTI value may be used for the purpose of PDSCH/PUSCH scrambling.

Alternatively, when implementing scrambling on Type A CCs, the base station may assign a single RNTI value to a UE for all CCs in the UE's Active CC Set or Candidate CC Set. The single RNTI value may be a value that correspond to the anchor CC of the UE. In some cases, the base station may reserve the RNTI value for all CCs in the Candidate CC set to ensure that the RNTI value is available when the base station needs to activate these CCs. The scrambling on all the CCs may then be based on the cell ID of the Type A CC and the assigned RNTI value.

When implementing scrambling on Type B CCs, each Type B CC may be assigned a virtual RNTI, virtual cell ID or PCI values for both DL and UL channels by the base station. Because Type B CCs are not classified as cells, the RNTI, cell ID and PCI values are virtual. The virtual cell ID management may be deployment specific and can be managed as part of cell planning strategy similar to cell ID management. After the virtual cell ID is assigned to a Type B CC, the base station may manage its RNTI values for the virtual cell independently. The virtual cell ID can be transmitted to the UE using synchronization signals including the PSS and SSS. When PSS and SSS are not transmitted on a Type B CC, the base station can signal the virtual cell ID to the UE via RRC signaling. The scrambling on each Type B CC is then based on assigned virtual RNTI and virtual cell ID. Alternatively, a single RNTI may be assigned to the UE for scrambling on all active CCs. In this case, the scrambling on each Type B CC is then based on the virtual cell ID of the CC and the assigned RNTI value. In this implementation, the base station may be configured to maintain a registry identifying which cell ID to use for scrambling for the same type B CC that varies per transmission time interval (TTI).

Alternatively, for each Type B CC, the scrambling for the PDSCH/PUSCH and PDCCH (if present) may correspond to (e.g., be equal to, or be a predictable modification of) that of the anchor CC (or another designated Type A CC). This option may also be applied to other non-anchor Type A CCs. In this implementation, all CCs for a given UE may use the same scrambling, as determined by the PCI and RNTI of the anchor CC or a particular assigned RNTI for all CCs.

Figure 5:
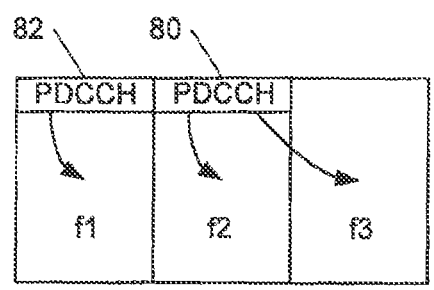
FIG. 5 illustrates a control channel implementation where a single PDCCH may allocate resources on one or more CCs.

In some cases, the PDCCH of one carrier may be configured to make PDSCH/PUSCH resource allocations on multiple CCs, including the CC via which the PDCCH was originally transmitted. FIG. 5 illustrates a control channel implementation where a single PDCCH 80 may allocate resources on one or more CCs. As shown, the PDCCH 82 on CC f1 only allocates resources on CC f1. However, the PDCCH 80 on CC f2 allocates resources on both CCs f2 and f3. In this example, CC f3 does not include a PDCCH as its resources may be allocated by PDCCH 80 of CC f2.

Using the control channel configuration shown in FIG. 5, scrambling of PDCCH 80 that allocates PDSCH/PUSCH resources on CC f3 may be implemented using the C-RNTI/cell ID corresponding to the PDCCH 80 on CC f2. The scrambling of PDSCH/PUSCH on CC f3 may be implemented using the C-RNTI/cell ID corresponding to the PDSCH/PUSCH on CC f2. In this example, CC f2 shown on FIG. 5 is the CC transmitting the PDCCH and CC f3 is the CC transmitting the PDSCH/PUSCH.

Alternatively, when allocating PDSCH/PUSCH resources on CC f3, PDCCH 80 scrambling on CC f2 may use the C-RNTI/cell ID corresponding to the PDSCH/PUSCH CC f3. Conversely, when allocating PDSCH/PUSCH resources on CC f2, PDCCH 80 scrambling on CC f2 may use the C-RNTI/cell ID corresponding to the PDSCH/PUSCH CC f2. This configuration allows the base station to indicate the PDSCH/PUSCH CC implicitly via the PDCCH CC scrambling. In this implementation, the UE may be required to perform blind decoding on each PDCCH candidate using each potential C-RNTI/cell ID (e.g., by using the C-RNTI/cell ID of each of CCs f2 and f3 to attempt to decode PDCCH 80 on CC f2). If the CRC check is successful, the PDCCH corresponds to the CC having the C-RNTI/cell ID which was used to successfully blind decode the PDCCH candidate. This method for identifying the CC upon which the PDCCH allocates resources may be advantageous, because there are zero bits in the PDCCH used to indicate the CC to which PDSCH/PUSCH resources are assigned, saving overhead.

Distinguishing a Non-Backward Compatible Rel-10 Carrier from a Backward Compatible Rel-10 Carrier In some cases, it may be difficult for a UE to identify non-backward compatible CCs. Even though non-backward compatible, some Type A CCs may be fully accessible to a particular UE. For example, the sync channel and MIB/SIBs of such a Type A CC may be fully backward compatible with versions or releases of the specification prior to the introduction of carrier aggregation meaning that a legacy UE might attempt to camp on the carrier and then access that carrer. For a legacy UE in Idle mode the UE may attempt to read the MIB/SIBs of that CC if the signal strength is the strongest for that carrier frequency. In that case, the legacy UE may only find out that it is not permitted to camp or access the carrier after reading the SIB2 message received via that CC.

In one implementation of the present system, the idleModeMobilityControlInfo included in the RRCConnectionRelease message indicates the priority of the cell reselection of a certain carrier frequency. In that case, a non-backward compatible CC may not be assigned a priority. This approach, however, may only work for UEs that have previously entered RRC_CONNECTED state and may not work for UEs that have recently powered on. Any CC that is not assigned a priority value may not be considered by the UE for the purpose of cell reselection. While this can prevent a UE from attempting to reselect to a non backwards compatible CC, it does not prevent the UE from attempting to select the non backward compatible CC at cell selection (for example, when the UE is first switched on, or when it is attempting to recover from loss of coverage).

In a second approach, different types of sequences for PCI/PSC are defined for the non-backward compatible CC so that legacy UEs will not be able to detect a non-backward compatible CC. This approach has the constraint that all the neighbor base stations in the network should configure the same CC frequency as the non-backward compatible CC so that the legacy UE cell search and measurement will not be affected. The constraint of the approach is that the UE may keep trying to decode the MIB until a certain failure criteria is satisfied causing the UE to stop attempting to read the MIB and to consider the cell as barred (i.e. a cell that it is not permitted to camp on or access)

In a third approach, a different format (coding rate, payload size etc.) for the MIB is defined on the non-backward compatible CC so that a legacy UE will not be able to decode the MIB and therefore will not proceed to decode other SIBs. After failing to decode the MIB, the UE may consider the cell as barred.

In a fourth approach, an explicit indication may be included in the SIB1. The existing cell barred indication in SIB1 can be used to prevent a legacy UEs from further accessing the cell or CC and reading the subsequent SI message. The IE intraFreqReselection in SIB1 can also be used to indicate to the UE that all cells in the same frequency are barred so that UE will not search neighbor base stations for non-backward compatible CCs if those non-backward compatible CCs have the same frequency. Because a UE compliant to a release of the specification that does support carrier aggregation (i.e. a non legacy UE) may need to know that those 'barred' cell are accessible such non legacy UEs, a new field is added to SIB1 to indicate to the non legacy UEs whether the cell is actually barred for the non legacy UEs. If the new field is not present in the SI, for example because it is a legacy cell that does not support the new field, then the UE may be configured to operate in accordance with the original cellBarred SI field that was present in versions or releases of the specification prior to the introduction of carrier aggregation. If the new field is present, a non legacy UE may ignore the original cellBarred field and only act upon the setting of the new cellBarred2 field.

As shown in Table 7 (FIG. 16), an example RRC signaling to provide an indication in SIB1 as to whether the CC is a non-backward compatible CC as described above. Changes with respect to the SystemInformationBlockType1 specified prior to the version or release in which carrier aggregation was introduced are underlined.

In a fifth approach, the frequency band indicator contained in an SIB1 message may be used to indicate whether a CC is backward compatible. In this case, a new frequency band may be defined that may use the same downlink frequencies as defined for a pre-existing band, but that supports a different duplex spacing. A legacy UE would not recognize the new band which is included in SIB1 and therefore would consider the cell inaccessible.

Generally, different approaches may be used for Type A and Type B CCs. For example, the second approach may be used for a Type B CC if the Type B CC transmits synchronization signals. If, however, a Type B CC does not transmit synchronization signals, a legacy UE may not be able to detect the CC and therefore will not attempt to read the MIB/SIBs of the CC.

Mobility Measurement

In existing network implementations, measurement objects and measurement identities are configured for a UE by the base station to trigger measurement reporting from the UE. A measurement object is associated with a particular carrier frequency, which may be the same frequency as the serving cell or a different frequency for the case of inter-frequency measurement. The base station can configure more than one measurement objects for a UE. To trigger measurement reporting from a UE, the base station configures one or more measurement identities for a UE. Each measurement identity is associated with a measurement object and a reporting configuration. A reporting configuration defines the criteria upon which the measurement reporting from the UE is triggered. Five measurement reporting trigger events (A1 to A5) are defined in 3GPP TS 36.331 V8.6.0 Technical Specification Group Radio Access Network; Evolved Universal Terrestrial Radio Access (E-UTRA); Radio Resource Control (RRC); Protocol specification (Release 8), June 2009.

In the present system, the base station may configure measurement objects for all of the CCs in the UE's Active CC set, where one measurement object corresponds to one CC frequency. It may not be necessary for a UE to perform mobility measurement on all the active CCs since the channel condition (e.g. RSRP, RSRQ) for CCs within the same band may be similar. In one implementation, the base station may configure measurement objects for a subset of the CCs in the UE's Active CC set. In another implementation, the base station may configure measurement objects for all or a subset of the CCs in the UE's Candidate CC set. In yet another implementation, the base station may configure a measurement object for a carrier which is not in the UE's Candidate CC set. For each configured measurement object that corresponds to a particular CC frequency, the base station may configure one or more measurement identities, each corresponding to a different reporting configuration.

The base station may not configure measurement gaps for the UE to perform measurement on a CC which is in the UE's Active CC set since the UE has enabled signal reception on CCs within the UE's Active CC set. The base station may configure measurement gaps for the UE to perform measurement on a CC which is not in the UE's Active CC set.

Five measurement reporting trigger events (C1 to C4) are defined. C1 defines the measurement reporting criteria based on: the signal quality (RSRP or RSRQ) of the CC in the UE's Candidate CC set with carrier frequency corresponding to the measurement object, better than a configured threshold. C2 defines the measurement reporting criteria based on: the signal quality (RSRP or RSRQ) of the CC in the UE's Candidate CC set with carrier frequency corresponding to the measurement object, worse than a configured threshold. C3 defines the measurement reporting criteria based on: the signal quality (RSRP or RSRQ) of a neighbor cell on the carrier frequency corresponding to the measurement object, becomes offset better than the signal quality (RSRP or RSRQ) of the CC in the UE's Candidate CC set with carrier frequency corresponding to the measurement object. C4 defines the measurement reporting criteria based on: the signal quality (RSRP or RSRQ) of the CC in the UE's Candidate CC set with carrier frequency corresponding to the measurement object, worse than a configured threshold1; while the signal quality (RSRP or RSRQ) of a neighbor cell on the carrier frequency corresponding to the measurement object, better than a configured threshold2.

Radio Link Failure (RLF)

In existing network implementation, RLF is defined as a situation when a UE experiences 'out-of-sync' at the DL physical layer for a predefined duration; or when random access failure is experienced on the UL; or when maximum number of retransmissions has been reached at the Radio Link Control (RLC). A UE estimates the DL radio link quality of the serving cell based on the cell-specific reference signal (RS) and compare it to a threshold Qout. If the radio link quality is below Qout, then the UE experience 'out-of-sync'. The threshold Qout is defined as the level at which the DL radio link cannot be reliably received and corresponds to [10%] block error rate of a hypothetical PDCCH transmission taking into account the PCFICH errors. When RLF occurs, the UE enters RLF recovery procedure, which includes cell selection and RRC connection re-establishment.

In the present system, when a UE is assigned multiple CCs in the UE's Active CC set, RLF may be defined based on the radio link quality of one, or more or all of the CCs in the UE's Active CC set. A UE experiencing poor radio link quality on one CC may not experience poor radio link quality on another CC even if they are on the same band. This is because the carrier deployments in the network may not be uniform across base stations. In addition, pico or femto cells that are deployed within the coverage area of a macro cell on a certain carrier frequency will create additional interference on that carrier frequency. For CCs on different band, if the UE experiences poor radio link quality on the lower frequency band, it is likely that it will experience poor radio link quality on the higher frequency band.

In the DL, the connection between the base station and UE is considered lost when the UE cannot receive any PDCCH transmitted from the base station for a predefined duration, since neither PDSCH nor PUSCH resource can be allocated to the UE to carry any user plane and control plane traffic. As previously described, a UE can be assigned one or multiple DL PDCCH monitoring CCs in the Active CC set. If all DL PDCCH monitoring carriers experience 'out-of-sync' for a predefined duration, or all UL carriers experience random access failure, the UE is considered to be in RLF and enters RLF recovery procedure. If at least one DL PDCCH monitoring CC does not experience 'out-of-sync' and at least one UL carrier does not experience random access failure, the UE is not considered to be in RLF. The UE reports the DL and/or UL radio link quality situation of the affected carriers to the base station using the remaining DL PDCCH monitoring CCs which do not experience 'out-of-sync' and remaining UL carriers which do not experience random access failure. The base station may re-assign different DL and/or UL CCs to the UE via signaling such as RRC signaling or MAC control element.

In one implementation, a DL PDCCH monitoring carrier assigned to the UE is associated with a subset of the UL carriers assigned to the UE. The DL PDCCH monitoring carrier only sends PUSCH resource assignment for its associated UL carriers. Another DL PDCCH monitoring carrier is associated with another subset of the UL carriers assigned to the UE. RLF occurs when the UE cannot receive PDCCH from the base station that allocate UL PUSCH resource on any of the UL carriers which do not experience random access failure. For example, a DL PDCCH monitoring carrier, $C_{DL\_1}$, is associated with the UL carrier, $C_{UL\_1}$. Another DL PDCCH monitoring carrier, $C_{DL\_2}$, is associated with another UL carrier, $C_{UL\_2}$. When $C_{DL\_1}$ experiences 'out-of-sync' for a predefined duration and $C_{UL\_2}$ experiences random access failure, the UE is considered in RLF since $C_{DL\_2}$ cannot send PDCCH to assign PUSCH on $C_{UL\_1}$. In one implementation, the base station may detect that a UE is experiencing 'out-of-sync' on a DL PDCCH monitoring carrier through PDSCH failure on that carrier. In that case, the base station may transmit signaling to the UE (e.g. RRC signaling or MAC control element) to re-assign the association of UL carriers with the remaining DL PDCCH monitoring carriers which do not experience 'out-of-sync'. In another implementation, when the UE detects that a DL PDCCH monitoring carrier is experiencing 'out-of-sync' condition for a predefined duration, the UE informs the base station through signaling (RRC signaling or MAC control element) on an UL carrier which is associated with a DL PDCCH monitoring carrier that does not experience 'out-of-sync' condition.

In another embodiment, the base station may detect that a UE is experiencing random access failure on a UL carrier though received signal strength of the random access channel transmitted from the UE. In that case, the base station may signal the UE (through RRC signaling or MAC control element) to re-assign the association of remaining UL carriers with the DL PDCCH monitoring carriers to distribute the number of UL carriers associated with each DL PDCCH monitoring, or to ensure each DL PDCCH monitoring carrier has at least on associated UL carrier.

To prevent RLF as described above to occur, the base station may configure a UE to send measurement report on one or more of the CCs in the UE's Active CC set. The reporting configuration can be set such that measurement reporting from the UE is triggered on a particular CC well in advance of the occurrence of the 'out-of-sync' condition on that CC. In another embodiment, the base station may configure the UE to transmit DL channel quality indicator (CQI) periodically on UL PUCCH or PUSCH. Through monitoring the DL CQI feedback from the UE on a CC, the base station can estimate when 'out-of-sync' condition is likely to occur on the CC.

When the base station detects that a UE is in poor radio link qualtiy may experience 'out-of-sync' condition on a CC through the methods described above, the base station may signal the UE (through RRC signaling or MAC control element) to de-allocate the CC, i.e. to remove the CC from the UE's Candidate CC set; or to instruct the UE to disable signal reception on the CC, i.e. to remove the CC from the UE's Active CC set. If this CC is a PDCCH monitoring carrier, the base station may assign another CC as PDCCH monitoring CC for the UE.

In another embodiment, a subset of the DL PDCCH monitoring CCs assigned to the UE are designated as the DL radio link monitoring CC set. A subset of the UL CCs assigned to the UE are designated as the UL radio link monitoring CC set. The CCs for these sets may be selected such that these CCs can represent other CCs not in the sets in terms of large scale fading (i.e. for other CCs in the same band), and carriers loading and interference conditions.

If all CCs in the DL radio link monitoring CC set experience 'out-of-sync' for a predefined duration, or all UL CCs in the UL radio link monitoring CC set experience random access failure, the UE is considered to be in RLF and enters RLF recovery procedure. If at least one CC in the DL radio link monitoring CC set does not experience 'out-of-sync' and at least one UL CC in the UL radio link monitoring CC set does not experience random access failure, the UE is not considered to be in RLF. The UE reports the DL and/or UL radio link quality situation of the affected CCs to the base station using the remaining DL PDCCH monitoring CCs which do not experience 'out-of-sync' and remaining UL CCs which do not experience random access failure. The base station may re-assign different DL and/or UL CCs to the UE and to the UE's DL/UL radio link monitoring CC sets via signaling such as RRC signaling or MAC control element.

At any time, if maximum number of retransmissions has been reached at the RLC, a UE is considered in RLF and RLF recovery process is triggered.

Figure 6:
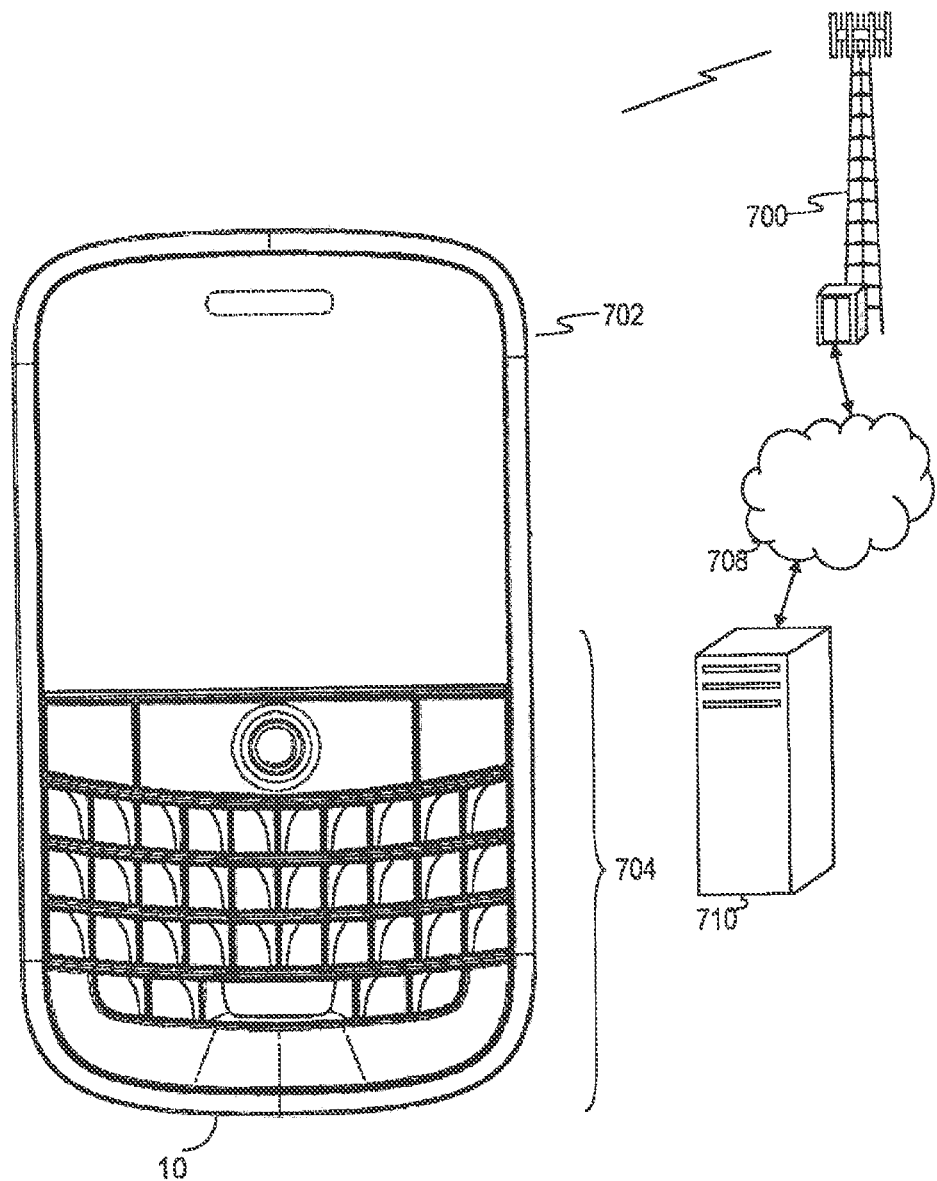
FIG. 6 is a diagram of a wireless communications system including a UE operable for some of the various embodiments of the disclosure.

FIG. 6 illustrates a wireless communications system including an embodiment of UA 10. UA 10 is operable for implementing aspects of the disclosure, but the disclosure should not be limited to these implementations. Though illustrated as a mobile phone, the UA 10 may take various forms including a wireless handset, a pager, a personal digital assistant (PDA), a portable computer, a tablet computer, a laptop computer. Many suitable devices combine some or all of these functions. In some embodiments of the disclosure, the UA 10 is not a general purpose computing device like a portable, laptop or tablet computer, but rather is a special-purpose communications device such as a mobile phone, a wireless handset, a pager, a PDA, or a telecommunications device installed in a vehicle. The UA 10 may also be a device, include a device, or be included in a device that has similar capabilities but that is not transportable, such as a desktop computer, a set-top box, or a network node. The UA 10 may support specialized activities such as gaming, inventory control, job control, and/or task management functions, and so on.

The UA 10 includes a display 702. The UA 10 also includes a touch-sensitive surface, a keyboard or other input keys generally referred as 704 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UA 10 may present options for the user to select, controls for the user to actuate, and/or cursors or other indicators for the user to direct.

The UA 10 may further accept data entry from the user, including numbers to dial or various parameter values for configuring the operation of the UA 10. The UA 10 may further execute one or more software or firmware applications in response to user commands. These applications may configure the UA 10 to perform various customized functions in response to user interaction. Additionally, the UA 10 may be programmed and/or configured over-the-air, for example from a wireless base station, a wireless access point, or a peer UA 10.

Among the various applications executable by the UA 10 are a web browser, which enables the display 702 to show a web page. The web page may be obtained via wireless communications with a wireless network access node, a cell tower, a peer UA 10, or any other wireless communication network or system 700. The network 700 is coupled to a wired network 708, such as the Internet. Via the wireless link and the wired network, the UA 10 has access to information on various servers, such as a server 710. The server 710 may provide content that may be shown on the display 702.

Alternately, the UA 10 may access the network 700 through a peer UA 10 acting as an intermediary, in a relay type or hop type of connection.

Figure 7:
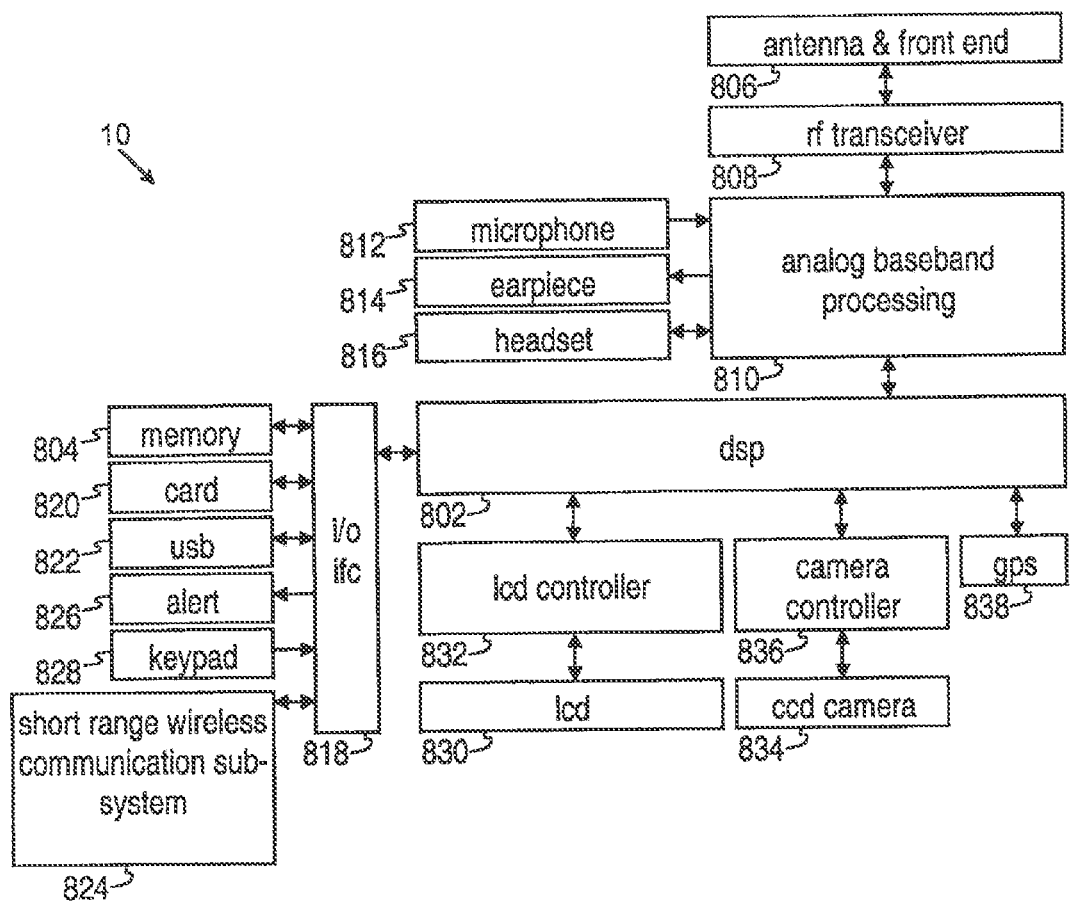
FIG. 7 is a block diagram of a UA operable for some of the various embodiments of the disclosure.

FIG. 7 shows a block diagram of the UA 10. While a variety of known components of UAs 110 are depicted, in an embodiment a subset of the listed components and/or additional components not listed may be included in the UA 10. The UA 10 includes a digital signal processor (DSP) 802 and a memory 804. As shown, the UA 10 may further include an antenna and front end unit 806, a radio frequency (RF) transceiver 808, an analog baseband processing unit 810, a microphone 812, an earpiece speaker 814, a headset port 816, an input/output interface 818, a removable memory card 820, a universal serial bus (USB) port 822, a short range wireless communication sub-system 824, an alert 826, a keypad 828, a liquid crystal display (LCD), which may include a touch sensitive surface 830, an LCD controller 832, a charge-coupled device (CCD) camera 834, a camera controller 836, and a global positioning system (GPS) sensor 838. In an embodiment, the UA 10 may include another kind of display that does not provide a touch sensitive screen. In an embodiment, the DSP 802 may communicate directly with the memory 804 without passing through the input/output interface 818.

The DSP 802 or some other form of controller or central processing unit operates to control the various components of the UA 10 in accordance with embedded software or firmware stored in memory 804 or stored in memory contained within the DSP 802 itself. In addition to the embedded software or firmware, the DSP 802 may execute other applications stored in the memory 804 or made available via information carrier media such as portable data storage media like the removable memory card 820 or via wired or wireless network communications. The application software may comprise a compiled set of machine-readable instructions that configure the DSP 802 to provide the desired functionality, or the application software may be high-level software instructions to be processed by an interpreter or compiler to indirectly configure the DSP 802.

The antenna and front end unit 806 may be provided to convert between wireless signals and electrical signals, enabling the UA 10 to send and receive information from a cellular network or some other available wireless communications network or from a peer UA 10. In an embodiment, the antenna and front end unit 806 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 806 may include antenna tuning and/or impedance matching components, RF power amplifiers, and/or low noise amplifiers.

The RF transceiver 808 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 810 and/or the DSP 802 or other central processing unit. In some embodiments, the RF Transceiver 808, portions of the Antenna and Front End 806, and the analog base band processing unit 810 may be combined in one or more processing units and/or application specific integrated circuits (ASICs).

The analog baseband processing unit 810 may provide various analog processing of inputs and outputs, for example analog processing of inputs from the microphone 812 and the headset 816 and outputs to the earpiece 814 and the headset 816. To that end, the analog baseband processing unit 810 may have ports for connecting to the built-in microphone 812 and the earpiece speaker 814 that enable the UA 10 to be used as a cell phone. The analog baseband processing unit 810 may further include a port for connecting to a headset or other hands-free microphone and speaker configuration. The analog baseband processing unit 810 may provide digital-to-analog conversion in one signal direction and analog-to-digital conversion in the opposing signal direction. In some embodiments, at least some of the functionality of the analog baseband processing unit 810 may be provided by digital processing components, for example by the DSP 802 or by other central processing units.

The DSP 802 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 802 may perform modulation, coding, interleaving, and spreading, and for a receiver function the DSP 802 may perform despreading, deinterleaving, decoding, and demodulation. In another embodiment, for example in an orthogonal frequency division multiplex access (OFDMA) technology application, for the transmitter function the DSP 802 may perform modulation, coding, interleaving, inverse fast Fourier transforming, and cyclic prefix appending, and for a receiver function the DSP 802 may perform cyclic prefix removal, fast Fourier transforming, deinterleaving, decoding, and demodulation. In other wireless technology applications, yet other signal processing functions and combinations of signal processing functions may be performed by the DSP 802.

The DSP 802 may communicate with a wireless network via the analog baseband processing unit 810. In some embodiments, the communication may provide Internet connectivity, enabling a user to gain access to content on the Internet and to send and receive e-mail or text messages. The input/output interface 818 interconnects the DSP 802 and various memories and interfaces. The memory 804 and the removable memory card 820 may provide software and data to configure the operation of the DSP 802. Among the interfaces may be the USB interface 822 and the short range wireless communication sub-system 824. The USB interface 822 may be used to charge the UA 10 and may also enable the UA 10 to function as a peripheral device to exchange information with a personal computer or other computer system. The short range wireless communication sub-system 824 may include an infrared port, a Bluetooth interface, an IEEE 802.11 compliant wireless interface, or any other short range wireless communication sub-system, which may enable the UA 10 to communicate wirelessly with other nearby mobile devices and/or wireless base stations.

The input/output interface 818 may further connect the DSP 802 to the alert 826 that, when triggered, causes the UA 10 to provide a notice to the user, for example, by ringing, playing a melody, or vibrating. The alert 826 may serve as a mechanism for alerting the user to any of various events such as an incoming call, a new text message, and an appointment reminder by silently vibrating, or by playing a specific pre-assigned melody for a particular caller.

The keypad 828 couples to the DSP 802 via the interface 818 to provide one mechanism for the user to make selections, enter information, and otherwise provide input to the UA 10. The keyboard 828 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 830, which may include touch screen capability and also display text and/or graphics to the user. The LCD controller 832 couples the DSP 802 to the LCD 830.

The CCD camera 834, if equipped, enables the UA 10 to take digital pictures. The DSP 802 communicates with the CCD camera 834 via the camera controller 836. In another embodiment, a camera operating according to a technology other than Charge Coupled Device cameras may be employed. The GPS sensor 838 is coupled to the DSP 802 to decode global positioning system signals, thereby enabling the UA 10 to determine its position. Various other peripherals may also be included to provide additional functions, e.g., radio and television reception.

Figure 8:
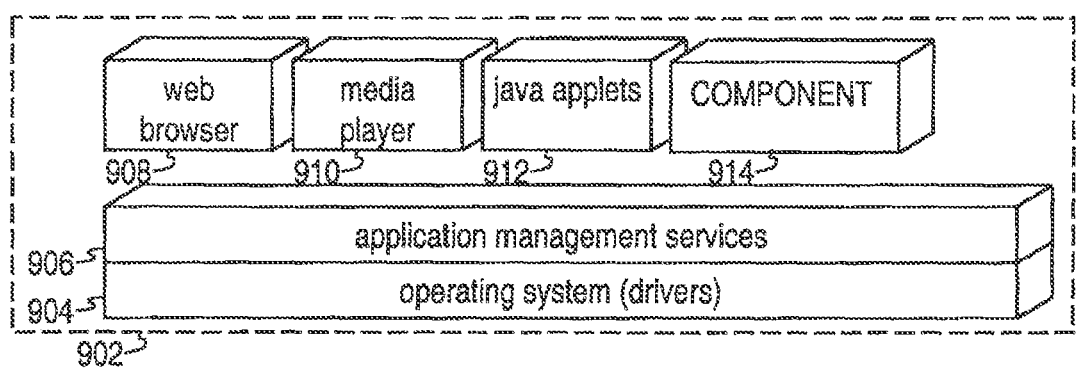
FIG. 8 is a diagram of a software environment that may be implemented on a UA operable for some of the various embodiments of the disclosure.

FIG. 8 illustrates a software environment 902 that may be implemented by the DSP 802. The DSP 802 executes operating system drivers 904 that provide a platform from which the rest of the software operates. The operating system drivers 904 provide drivers for the UA hardware with standardized interfaces that are accessible to application software. The operating system drivers 904 include application management services (AMS) 906 that transfer control between applications running on the UA 10. Also shown in FIG. 8 are a web browser application 908, a media player application 910, and Java applets 912. The web browser application 908 configures the UA 10 to operate as a web browser, allowing a user to enter information into forms and select links to retrieve and view web pages. The media player application 910 configures the UA 10 to retrieve and play audio or audiovisual media. The Java applets 912 configure the UA 10 to provide games, utilities, and other functionality. A component 914 might provide functionality described herein.

Figure 9:
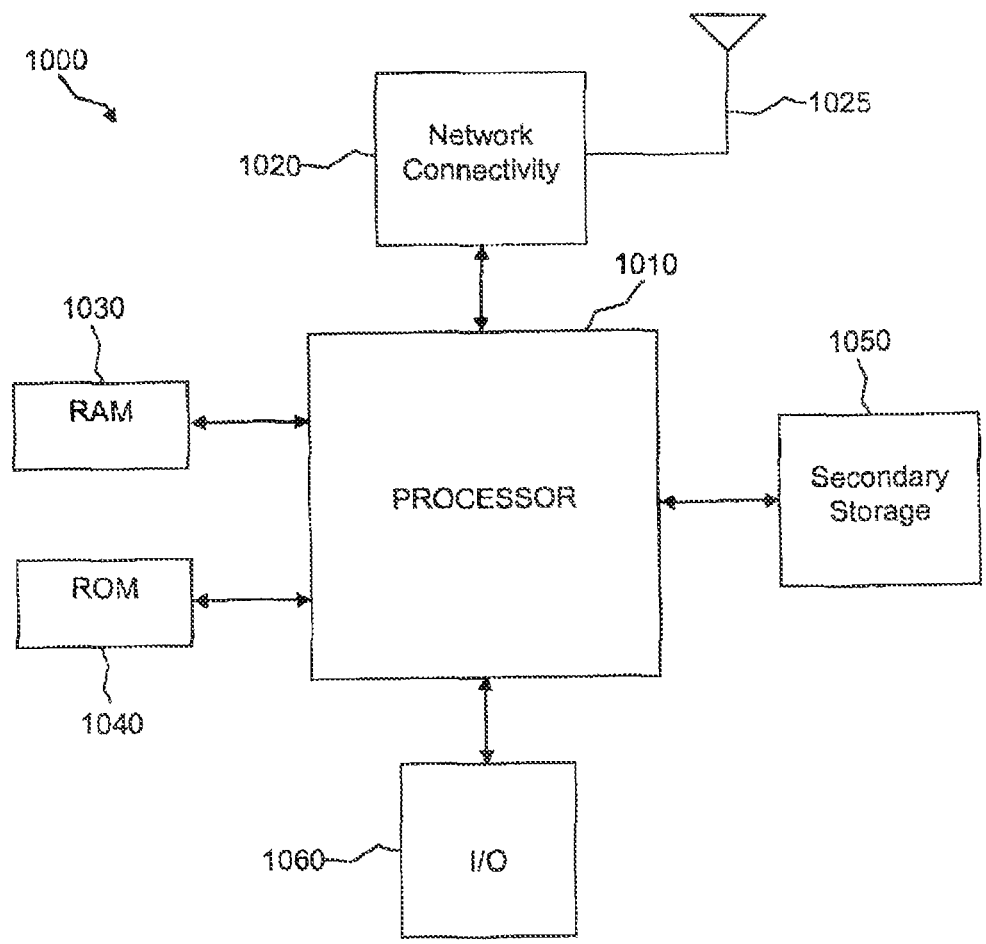
FIG. 9 is an illustrative general purpose computer system suitable for some of the various embodiments of the disclosure.

The UA 10, base station 120, and other components described above might include a processing component that is capable of executing instructions related to the actions described above. FIG. 9 illustrates an example of a system 1000 that includes a processing component 1010 suitable for implementing one or more embodiments disclosed herein. In addition to the processor 1010 (which may be referred to as a central processor unit (CPU or DSP), the system 1000 might include network connectivity devices 1020, random access memory (RAM) 1030, read only memory (ROM) 1040, secondary storage 1050, and input/output (I/O) devices 1060. In some cases, some of these components may not be present or may be combined in various combinations with one another or with other components not shown. These components might be located in a single physical entity or in more than one physical entity. Any actions described herein as being taken by the processor 1010 might be taken by the processor 1010 alone or by the processor 1010 in conjunction with one or more components shown or not shown in the drawing.

The processor 1010 executes instructions, codes, computer programs, or scripts that it might access from the network connectivity devices 1020, RAM 1030, ROM 1040, or secondary storage 1050 (which might include various disk-based systems such as hard disk, floppy disk, or optical disk). While only one processor 1010 is shown, multiple processors may be present. Thus, while instructions may be discussed as being executed by a processor, the instructions may be executed simultaneously, serially, or otherwise by one or multiple processors. The processor 1010 may be implemented as one or more CPU chips.

The network connectivity devices 1020 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1020 may enable the processor 1010 to communicate with the Internet or one or more telecommunications networks or other networks from which the processor 1010 might receive information or to which the processor 1010 might output information.

The network connectivity devices 1020 might also include one or more transceiver components 1025 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1025 might include separate receiving and transmitting units or a single transceiver. Information transmitted or received by the transceiver 1025 may include data that has been processed by the processor 1010 or instructions that are to be executed by processor 1010. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1030 might be used to store volatile data and perhaps to store instructions that are executed by the processor 1010. The ROM 1040 is a non-volatile memory device that typically has a smaller memory capacity than the memory capacity of the secondary storage 1050. ROM 1040 might be used to store instructions and perhaps data that are read during execution of the instructions. Access to both RAM 1030 and ROM 1040 is typically faster than to secondary storage 1050. The secondary storage 1050 is typically comprised of one or more disk drives or tape drives and might be used for non-volatile storage of data or as an over-flow data storage device if RAM 1030 is not large enough to hold all working data. Secondary storage 1050 may be used to store programs that are loaded into RAM 1030 when such programs are selected for execution.

The I/O devices 1060 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1025 might be considered to be a component of the I/O devices 1060 instead of or in addition to being a component of the network connectivity devices 1020. Some or all of the I/O devices 1060 may be substantially similar to various components depicted in the previously described drawing of the UA 10, such as the display 702 and the input 704.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made without departing from the spirit and scope disclosed herein.

What is claimed is:

1. A method, comprising:
   receiving, at a user equipment (UE), a component carrier assignment message via a first component carrier, wherein the first component carrier is different from a second component carrier, the first component carrier is a control channel monitoring component carrier, the component carrier assignment message identifies the second component carrier, the component carrier assignment message indicates that the second component carrier is not a control channel monitoring component carrier and that a control channel of the first component carrier signals channel assignment information for the second component carrier, and the component carrier assignment message includes a virtual physical cell identity (PCI) of the second component carrier; and
   configuring the second component carrier based on the component carrier assignment message.

2. The method of claim 1, wherein the control channel of the first component carrier is a physical downlink control channel (PDCCH).

3. The method of claim 1, wherein the first component carrier comprises a cell.

4. The method of claim 1, wherein the component carrier assignment message is received using dedicated signaling.

5. One or more non-transitory computer-readable media containing instructions that, when executed, cause a user equipment (UE) to perform operations comprising:
   receiving a component carrier assignment message via a first component carrier, wherein the first component carrier is different from a second component carrier, the first component carrier is a control channel monitoring component carrier, the component carrier assignment message identifies the second component carrier, the component carrier assignment message indicates that the second component carrier is not a control channel monitoring component carrier and that a control channel of the first component carrier signals channel assignment information for the second component carrier, and the component carrier assignment message includes a virtual physical cell identity (PCI) of the second component carrier; and
   configuring the second component carrier based on the component carrier assignment message.

6. The non-transitory computer-readable media of claim 5, wherein the control channel of the first component carrier is a physical downlink control channel (PDCCH).

7. The non-transitory computer-readable media of claim 5, wherein the first component carrier comprises a cell.

8. The non-transitory computer-readable media of claim 5, wherein the component carrier assignment message is received using dedicated signaling.

9. One or more non-transitory computer-readable media containing instructions that, when executed, cause an electronic device to perform operations comprising:
   transmitting, to a user equipment (UE), a component carrier assignment message via a first component carrier, wherein the first component carrier is different from a second component carrier, the first component carrier is a control channel monitoring component carrier, the component carrier assignment message identifies the second component carrier, the component carrier assignment message indicates that the second component carrier is not a control channel monitoring component carrier and that a control channel of the first component carrier signals channel assignment information for the second component carrier, and the component carrier assignment message includes a virtual physical cell identity (PCI) of the second component carrier; and
   transmitting, to the UE, data using the second component carrier.

10. The non-transitory computer-readable media of claim 9, wherein the control channel of the first component carrier is a physical downlink control channel (PDCCH).

11. The non-transitory computer-readable media of claim 9, wherein the first component carrier comprises a cell.

12. The non-transitory computer-readable media of claim 9, wherein the component carrier assignment message is transmitted using dedicated signaling.

* * * * *